US012675568B2

(12) United States Patent
Leplus et al.

(10) Patent No.: US 12,675,568 B2
(45) Date of Patent: Jul. 7, 2026

(54) MICROPROCESSOR EQUIPPED WITH AN ARITHMETIC AND LOGIC UNIT AND WITH A HARDWARE SECURITY MODULE

(71) Applicant: Commissariat à l'Energie Atomique et aux Energies Alternatives, Paris (FR)

(72) Inventors: Gaëtan Leplus, Grenoble Cedex (FR); Olivier Savry, Grenoble Cedex (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 1142 days.

(21) Appl. No.: 17/656,047

(22) Filed: Mar. 23, 2022

(65) Prior Publication Data

US 2022/0357927 A1 Nov. 10, 2022

(30) Foreign Application Priority Data

May 10, 2021 (FR) ..................................... 21 04898

(51) Int. Cl.
| | |
|---|---|
| *G06F 21/54* | (2013.01) |
| *G06F 9/30* | (2018.01) |
| *G06F 21/75* | (2013.01) |

(52) U.S. Cl.
CPC ............ *G06F 21/54* (2013.01); *G06F 9/3001* (2013.01); *G06F 9/30029* (2013.01); *G06F 9/30043* (2013.01); *G06F 21/75* (2013.01)

(58) Field of Classification Search
CPC .... G06F 21/54; G06F 9/3001; G06F 9/30029; G06F 9/30043; G06F 17/16; H04L 9/004; H04L 9/06; H04L 9/34; H04L 9/0877
See application file for complete search history.

(56) References Cited

U.S. PATENT DOCUMENTS

| | | | | |
|---|---|---|---|---|
| 5,442,705 A | * | 8/1995 | Miyano | ................. H04L 9/0625 |
| | | | | 380/44 |
| 2019/0080096 A1 | | 3/2019 | Savry | |
| 2021/0194689 A1 | * | 6/2021 | Susella | ..................... H04L 9/14 |

FOREIGN PATENT DOCUMENTS

| | | |
|---|---|---|
| EP | 3 457 620 A1 | 3/2019 |
| FR | 3 071 082 A1 | 3/2019 |

OTHER PUBLICATIONS

R. Nathan et al., "Nostradamus: Low-cost hardware-only error detection for processor cores," 2014 Design, Automation & Test in Europe Conference & Exhibition, Dresden, Germany, pp. 1-6, doi: 10.7873/DATE.2014.173 (Year: 2014).*

(Continued)

*Primary Examiner* — Andrew Caldwell
(74) *Attorney, Agent, or Firm* — Oblon, McClelland, Maier & Neustadt, L.L.P.

(57) ABSTRACT

A microprocessor is provided to compute a code used to detect an execution fault, using a relationship $C_i = P \circ F_a(D_i)$, where:

$F_a(D_i) = E_0 \circ \ldots \circ E_q \circ \ldots \circ E_{NbE-1}(D_i)$, $E_q(x) = T_{am,q} \circ \ldots \circ T_{aj,q} \circ \ldots \circ T_{a1,q} \circ T_{a1,q}(x)$, and $T_{aj,q}$ is a conditional transposition, configured by a secret parameter $\alpha_{j,q}$, that permutes two blocks of bits $B_{2j+1,q}$ and $B_{2j,q}$ of the variable x only when the parameter $\alpha_{j,q}$ is equal to a first value, the blocks $B_{2j+1,q}$ and $B_{2j,q}$ of all of the transpositions $T_{aj,q}$ of the stage $E_q$ being different from one another and not overlapping and the blocks $B_{2j+1,q}$ and $B_{2j,q}$ are placed within one and the same block of greater size permuted by a transposition of the higher stage $E_{q+1}$.

4 Claims, 10 Drawing Sheets

LEGEND:
86 – provide the binary code
88 – compute the code $C_i$ using $C_i = F_a(D_i)$
90 – write $D_i$ and $C_i$ to register $R_i$
94 – check for an error in $D_i$
    + (no error, proceed to 96)
    - (error, proceed to 102)
96 – decode the arithmetic and logic instruction
98 – compute the code $C_{res\text{-}t}$
100 – check whether the computed code $C_{res\text{-}t}$ corresponds to a code $C_{res\text{-}p}$ computed from the result $D_{res\text{-}p}$ stored in the register $R_{res\text{-}p}$.
    + (codes are the same and continue)
    - (codes are different, proceed to 102)
102 – trigger signalling of an execution fault
104 – implement countermeasure(s)

(56) References Cited

OTHER PUBLICATIONS

M. Morris Mano, "Digital Logic and Computer Design," Prentice-Hall, Inc., Upper Saddle River, New Jersey, USA. (Year: 1979).*

French Preliminary Search Report Issued Nov. 26, 2021 in French Application 21 04898 filed on May 10, 2021 (with English Translation of Categories of Cited Documents & Written Opinion), 12 pages.

Savry et al., "Confidaent: Control Flow Protection with Instruction and Data Authenticated Encryption", 2020 23$^{rd}$ Euromicro Conference on Digital System Design (DSD), Aug. 26, 2020, 8 Pages.

De Meyer et al., "M&M: Masks and Macs Against Physical Attacks", IACR Transactions on Cryptographic Hardware and Embedded Systems ISSN, vol. 2019, No. 1, DOI:10.13154/tches.v2019.i1.25-50, Nov. 9, 2018, 26 Pages.

* cited by examiner

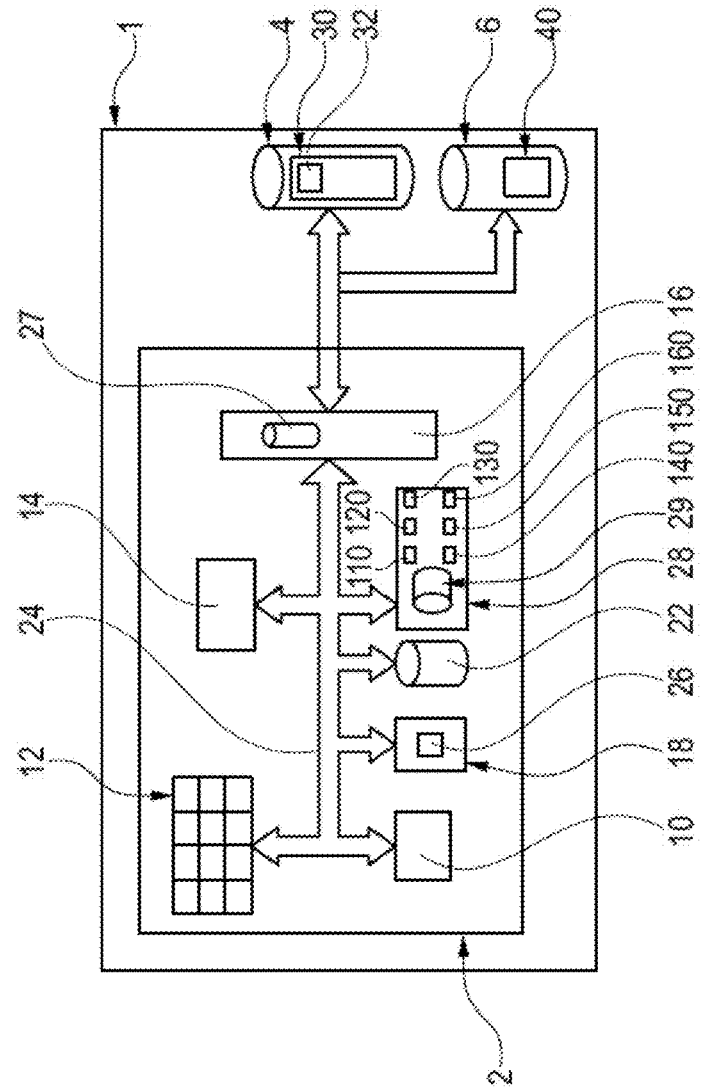

Fig. 1

LEGEND:

1 – electronic apparatus
2 – microprocessor
4 – memory
6 – mass storage medium
10 – arithmetic and logic unit
12 – registers
14 – control module
16 – data input/output interface
18 – instruction loader
22 – queue
24 – data interchange bus
26 – program counter
27 – cache memory
28 – hardware security module
29 – secure nonvolatile memory
30 – binary code
32 – machine code
40 – backup code of binary code
110 – computation circuit
120 – computation circuit
130 – computation circuit
140 – computation circuit
150 – permutator
160 – computation circuit

LEGEND:

86 – provide the binary code

88 – compute the code $C_i$ using $C_i = F_a(D_i)$

90 – write $D_i$ and $C_i$ to register $R_i$

94 – check for an error in $D_i$

+ (no error, proceed to 96)

- (error, proceed to 102)

96 – decode the arithmetic and logic instruction

98 – compute the code $C_{res-t}$

100 – check whether the computed code $C_{res-t}$ corresponds to a code $C_{res-p}$ computed from the result $D_{res-p}$ stored in the register $R_{res-p}$:

+ (codes are the same and continue)

- (codes are different, proceed to 102)

102 – trigger signalling of an execution fault

104 – implement countermeasure(s)

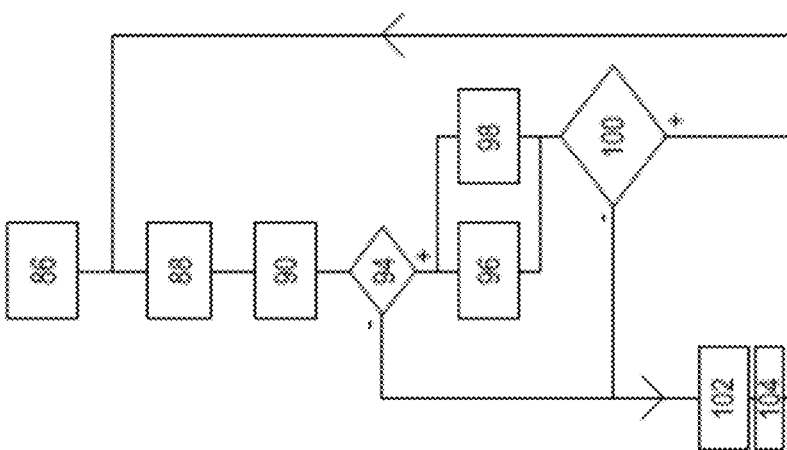

Fig. 4

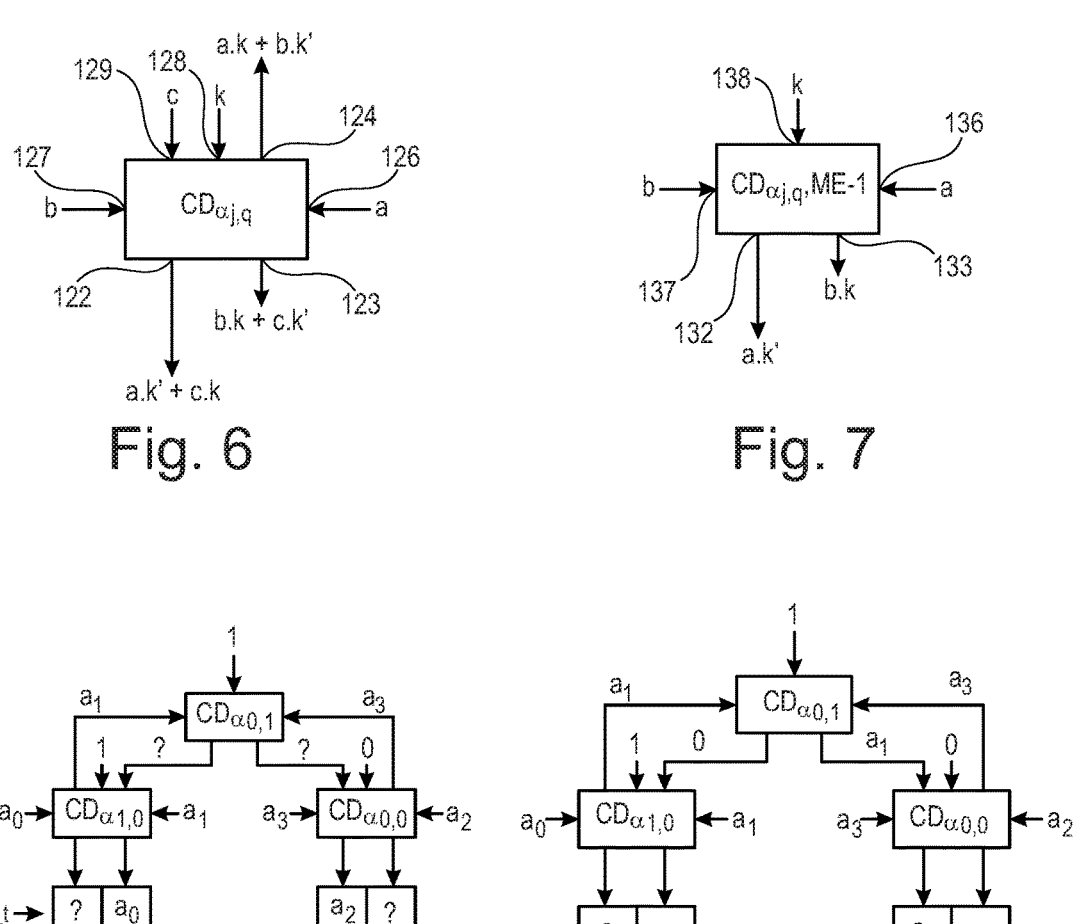
Fig. 6          Fig. 7
Fig. 8          Fig. 9
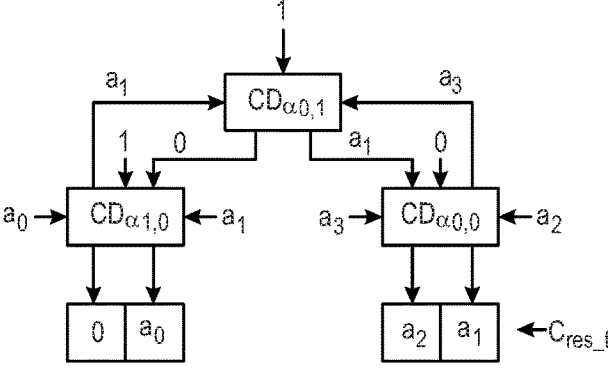
Fig. 10

LEGEND:
140 – computation circuit
142-145 – inputs
146-148 – outputs
150 – permutator
151 – permutator
154-155 – shift registers
158-159 - multiplexers LEGEND:
149 – computation circuit
152-153 – inputs
156-157 – outputs

MICROPROCESSOR EQUIPPED WITH AN ARITHMETIC AND LOGIC UNIT AND WITH A HARDWARE SECURITY MODULE

The invention relates to a microprocessor equipped with an arithmetic and logic unit and with a hardware security module.

Numerous attacks are possible in order to obtain information about a binary code or to cause unexpected operation of the binary code. For example, attacks known under the name "fault injection" or "fault attack" may be implemented. These attacks involve disrupting the operation of the microprocessor or the memory containing the binary code, using various physical means such as modifying supply voltages, modifying the clock signal, exposing the microprocessor to electromagnetic waves, inter alia.

Using such attacks, an attacker is able to alter the integrity of machine instructions or data in order for example to recover a secret key of a cryptographic system, bypass security mechanisms such as verification of a PIN code during authentication, or simply prevent the execution of a function essential to the security of a critical system.

These attacks may notably cause three types of fault, called execution faults, when the binary code is executed:

1) altering the instructions of the machine code that is executed,
2) altering the data stored in the main memory or in registers of the microprocessor, and
3) altering the control flow of the machine code.

The control flow corresponds to the execution path that is followed when the machine code is executed. The control flow is conventionally depicted in the form of a graph, known under the name "control flow graph".

To detect such execution faults, there has already been the proposal to associate an error correction code with each data item processed by the microprocessor, Next, the error correction code associated with the result of the instruction that processes these data is computed from the error correction codes of the processed data. In this way, if a fault occurs when this instruction is executed, the result obtained does not correspond to the computed error correction code. This allows this fault to be detected. Such a solution is for example disclosed in application FR3071082. The algorithm for constructing the error correction code associated with a data item is known. It is therefore possible for an attacker to inject faults in order to modify the error correction code computed for the result so that it corresponds to the faulted result. In this case, the execution fault is not detected.

To overcome the above disadvantage, it has been proposed that the error correction code be replaced by an integrity code. This integrity code is constructed from the data item and, in addition, using a secret key known only to the microprocessor. It is thus difficult for an attacker to modify an integrity code so that it corresponds to a faulted result, because he does not know the secret key. However, it should always be possible to construct the integrity code for the result using the integrity codes associated with the processed data and without using the result of the instruction executed by the arithmetic and logic unit. For example, such a solution is described in the following article: L. De Meyer, V. Arribas, S. Nikova, V. Nikov and V. Rijmen: "M&M: Masks and Macs against physical attacks", IACR Transactions on Cryptographic Hardware and Embedded Systems, pages 25-50, 2019. This article is subsequently denoted by the term "DEMEYER2019". The method described in this article for computing the integrity code for the result from the integrity codes of the processed data is complex. The reason is that it does this by using multiplications in a Galois field. Hardware circuits that rapidly compute multiplications in a Galois field are complex and slow. The method of DEMEYER2019 is therefore difficult to implement in a microprocessor, including in the case of Boolean operations.

Prior art is also known from EP3457620A1 and from the following article: Savry Olivier et al.: "Confident: Control Flow protection with Instruction and Data Authenticated Encryption", 2020 23 RD Euromicro Conference On Digital System Design, 26/08/2020, pages 246-253.

The objective is to propose a microprocessor that has the same level of security for at least one executed arithmetic and logic operation as that described in the article of DEMEYER2019 but that is easier to produce.

The invention therefore relates to such a microprocessor.

The invention will be better understood on reading the description that follows, which is given solely by way of non-limiting example, with reference to the drawings, in which:

FIG. 1 is a schematic illustration of the architecture of an electronic apparatus capable of executing a binary code;

Figure 5:
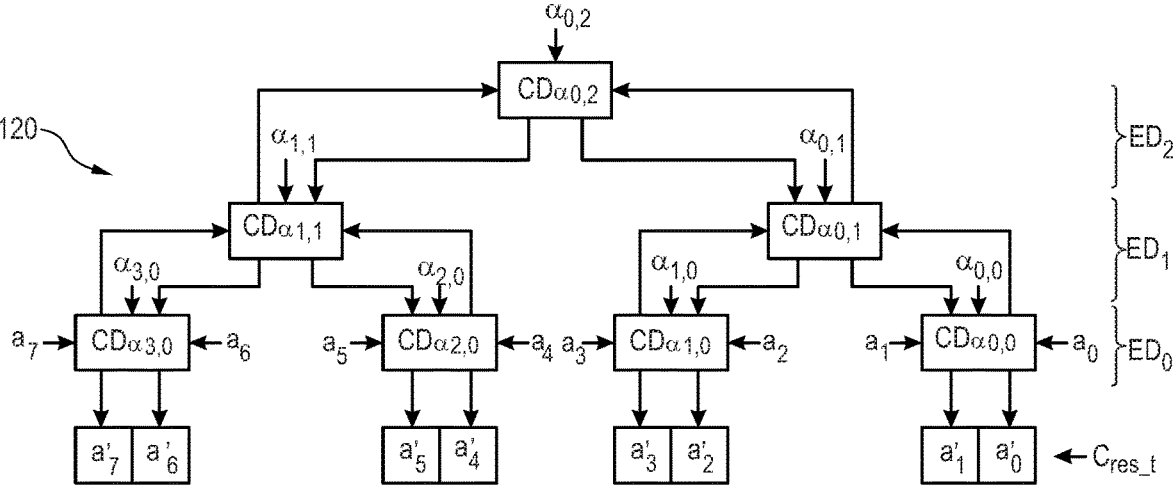
Figure 11:
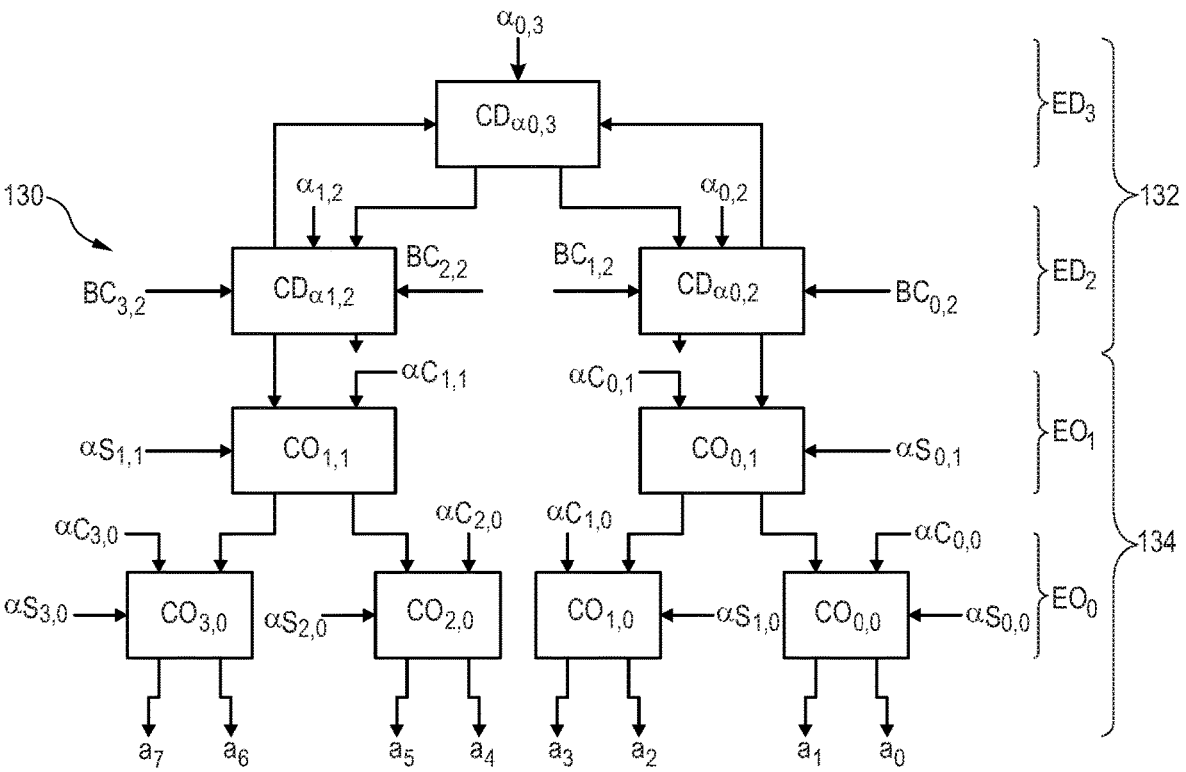
Figure 12:
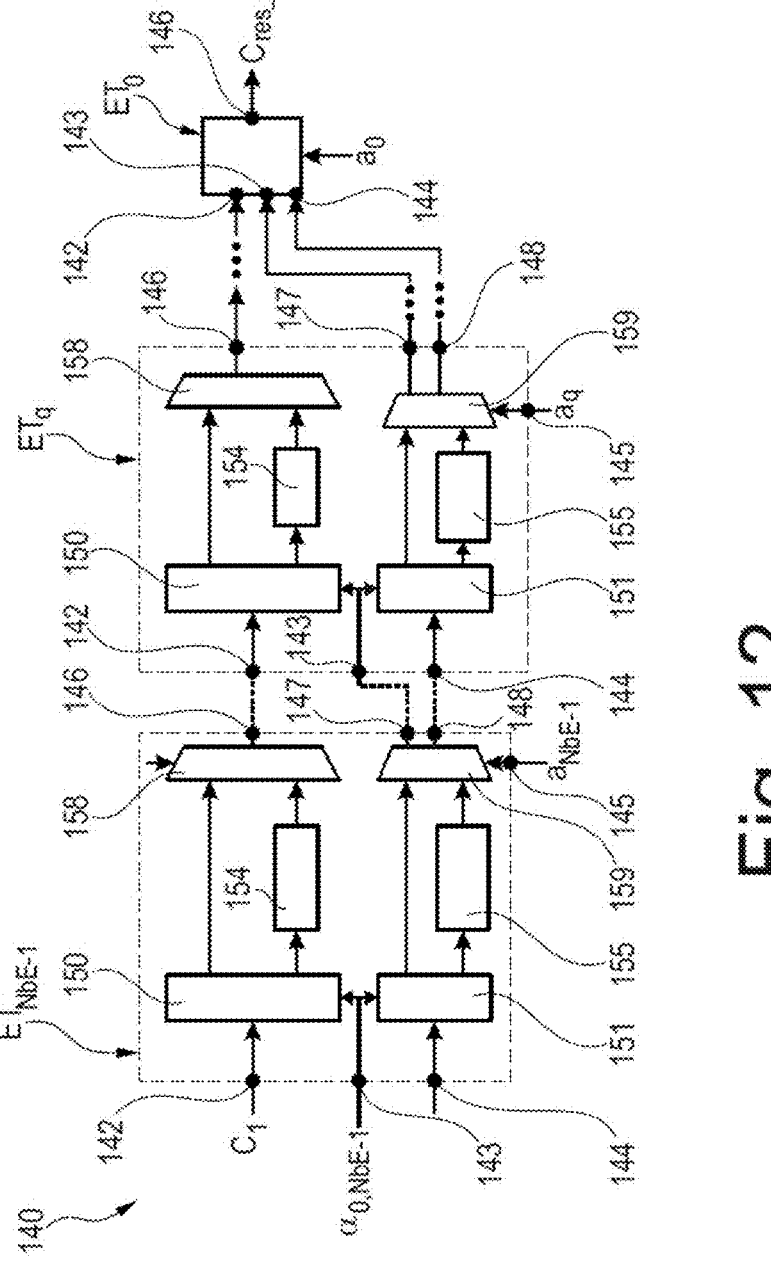
Figure 13:
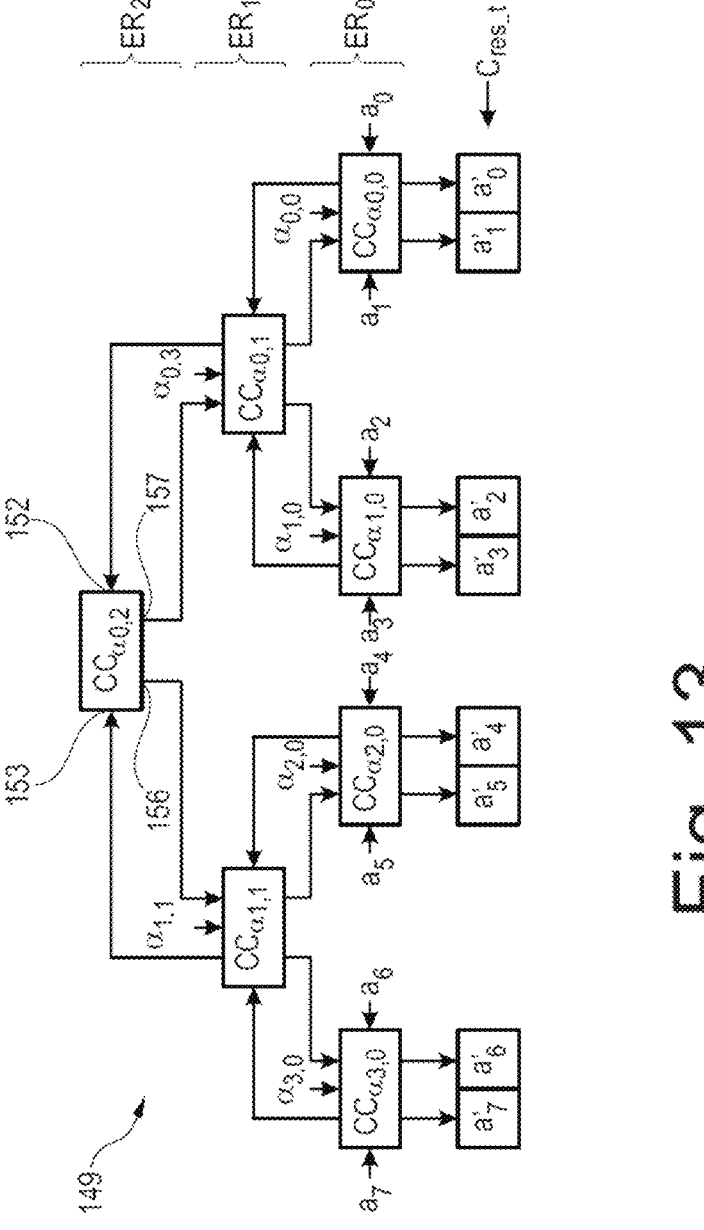
Figure 14:
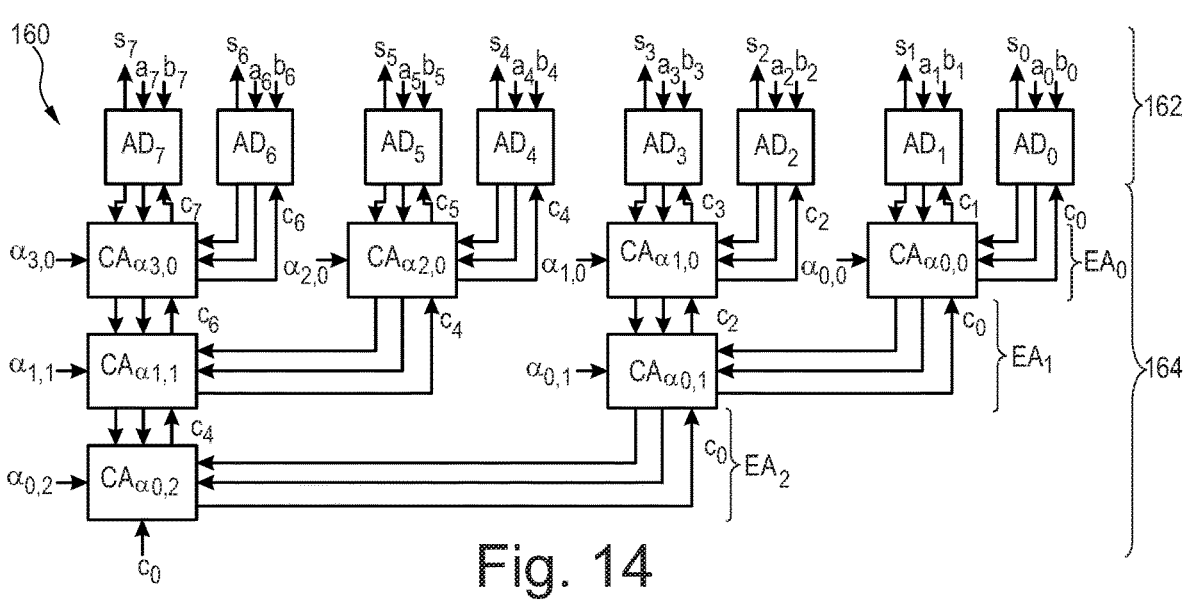
Figure 15:
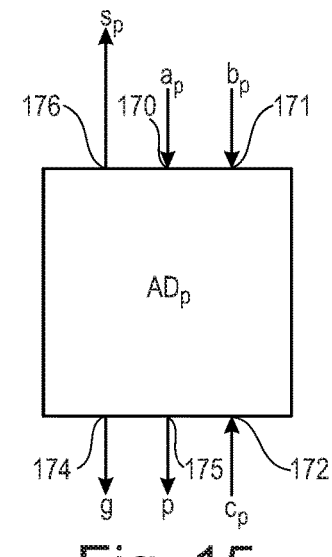
Figure 16:
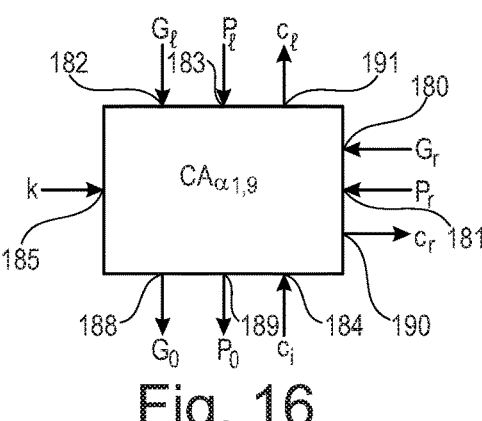

FIG. 4 is a flowchart of a method for executing the binary code by means of the apparatus of FIG. 1, FIG. 5 is a schematic illustration of a computation circuit for computing a code $C_{res-t}$ in the case of an arithmetic shift operation for shifting one bit to the left, FIGS. 6 and 7 are more detailed schematic illustrations of two components of the circuit of FIG. 5, FIGS. 8 to 10 are schematic illustrations of various operating states of the circuit of FIG. 5, FIG. 11 is a schematic illustration of a computation circuit for computing a code $C_{res-t}$ in the case of an arithmetic shift operation for shifting 2 bits to the left, FIG. 12 is a schematic illustration of a computation circuit for computing a code $C_{res-t}$ in the case of an arithmetic shift operation for shifting $a_{NbE-1}2^{NbE-1}+ \ldots +a_q2^q+ \ldots +a_0$ bits to the left, FIG. 13 is a schematic illustration of a computation circuit for computing a code $C_{res-t}$ in the case of an arithmetic rotation operation for rotating one bit to the left, FIG. 14 is a schematic illustration of a computation circuit for computing a code $C_{res-t}$ in the case of an arithmetic addition operation, and FIGS. 15 and 16 are more detailed schematic illustrations of two components of the circuit of FIG. 14.

SECTION I: CONVENTIONS, NOTATIONS AND DEFINITIONS

In the figures, the same references have been used to designate elements that are the same. In the rest of this description, features and functions that are well known to those skilled in the art will not be described in detail.

In this description, the following definitions have been adopted.

A "program" designates a set of one or more predetermined functions that it is desired to have executed by a microprocessor.

A "source code" is a representation of the program in a computer language, not being able to be executed directly by a microprocessor and being intended to be converted, by a compiler, into a machine code able to be executed directly by the microprocessor.

A program or a code is said to be "able to be executed directly" or "directly executable" when it is able to be executed by a microprocessor without this microprocessor needing to compile it beforehand by way of a compiler or to interpret it by way of an interpreter.

An "instruction" denotes a machine instruction able to be executed by a microprocessor. Such an instruction consists;

of an opcode, or operation code, that codes the nature of the operation to be executed, and of one or more operands defining the value(s) of the parameters of this operation.

The registers in which the data item or data to be processed by an instruction are stored are typically identified by one or more operands of the instruction. Likewise, the register $R_{res-p}$ in which the result $D_{res-p}$ of the execution of an instruction needs to be stored can also be identified by an operand of this instruction.

"Logic instruction" is used to denote an instruction from the set of instructions of the microprocessor 2 that, when executed by the arithmetic and logic unit, stores the result of a Boolean operation in a register $R_{res-p}$ of the microprocessor. The opcode of the logic instruction identifies the Boolean operation to be executed by the arithmetic and logic unit in order to modify or combine the data item or data $D_1$ to $D_n$. The "&" symbol is used below to generically denote a Boolean operation. Thus, the notation $D_1 \& D_2 \& \ldots \& D_n$ generically denotes a Boolean operation executed by the microprocessor 2 between the data $D_1$ to $D_n$. When n=1, the Boolean operation is the complement operation also known by the name "NOT". When n is greater than or equal to two, the Boolean operation is chosen from the group made up of the following Boolean operations and their composition:

the "OR" logic operation, the "EXCLUSIVE-OR" logic operation, the "AND" logic operation.

The following notations are used to denote Boolean operations:

the "OR" logic operation is denoted by the symbol "+"

the "EXCLUSIVE OR" logic operation is denoted by the symbol "XOR".

the "AND" logic operation is denoted by the symbol ".".

the "NOT" Boolean operation is denoted by the symbol "¯" placed after the variable for which the complement is computed.

"Arithmetic instruction" is used to denote an instruction from the set of instructions of the microprocessor 2 that, when executed by the unit 10, stores the result of an arithmetic operation in a register $R_{es-p}$ of the microprocessor. An arithmetic operation is different from a Boolean operation. An arithmetic operation typically belongs to the group made up of bit shift operations, bit rotation operations, addition operations, multiplication operations and division operations.

"Arithmetic and logic instruction" denotes both a logic instruction and an arithmetic instruction. Unless indicated otherwise, the term "instruction" denotes an arithmetic and logic instruction below.

A "machine code" is a set of machine instructions. It typically is a file containing a sequence of bits with the value "0" or "1", these bits coding the instructions to be executed by the microprocessor. The machine code is able to be executed directly by the microprocessor, that is to say without the need for a preliminary compilation or interpretation.

A "binary code" is a file containing a sequence of bits bearing the value "0" or "1". These bits code data and instructions to be executed by the microprocessor. The binary code thus comprises at least one machine code and also, in general, digital data processed by this machine code.

The expression "execution of a function" is understood to designate execution of the instructions making up this function.

A block of bits of a data item or of a variable is a group of consecutive bits of this data item or of this variable. The size of a block of bits is equal to the number of bits contained in this block.

SECTION II: ARCHITECTURE OF THE APPARATUS

FIG. 1 shows an electronic apparatus 1 comprising a microprocessor 2, a main memory 4 and a mass storage medium 6. For example, the apparatus 1 is a computer, a smartphone, an electronic tablet, a chip card or the like.

The microprocessor 2 here comprises:

an arithmetic and logic unit 10;

a set 12 of registers;

a control module 14;

a data input/output interface 16, an instruction loader 18 having a program counter 26, a queue 22 of instructions to be executed, and a hardware security module 28.

The memory 4 is configured so as to store instructions of a binary code 30 of a program to be executed by the microprocessor 2. The memory 4 is a random access memory. The memory 4 is typically a volatile memory. The memory 4 may be a memory external to the microprocessor 2, as shown in FIG. 1. In this case, the memory 4 is formed on a substrate that is mechanically separate from the substrate on which the various elements of the microprocessor 2, such as the unit 10, are formed.

By way of illustration, the binary code 30 notably comprises a machine code 32 of a secure function. Each secure function corresponds to a set of several lines of code, for example several hundred or thousand lines of code, stored at successive addresses in the memory 4. Each line of code corresponds here to a machine word. A line of code is thus loaded into a register of the microprocessor 2 in a single read operation.

Likewise, a line of code is written to the memory 4 by the microprocessor 2 in a single write operation. Each line of code codes either a single instruction or a single data item.

By way of illustration, the microprocessor 2 is a reduced instruction set computer more commonly known by the acronym RISC.

The loader 18 loads the next instruction to be executed by the unit 10 into the queue 22 from the memory 4. More precisely, the loader 18 loads the instruction to which the program counter 26 points. To this end, the queue 22 comprises a succession of multiple registers.

The unit 10 is notably configured to execute one after another the instructions loaded into the queue 22. The instructions loaded into the queue 22 are generally consistently executed in the order in which these instructions were stored in this queue 22. The unit 10 is also capable of storing the result of these executed instructions in one or more of the registers of the set 12.

In this description, "execution by the microprocessor 2" and "execution by the unit 10" will be used synonymously.

The module 14 is configured to move data between the set 12 of registers and the interface 16. The interface 16 is notably able to acquire data and instructions, for example from the memory 4 and/or the medium 6 that are external to the microprocessor 2. To speed up transfers of data and instructions between the microprocessor 2 and the memory 4 here, the interface 16 comprises one or more cache memories. To simplify FIG. 1, only one cache memory 27 is shown. This cache memory 27 is used to temporarily store the data processed by the microprocessor 2 on the same chip as the unit 10.

The module 28 is capable of automatically executing the various operations described in detail in the sections that follow in order to make the execution of the arithmetic and logic instructions by the unit 10 secure. The module 28 operates independently and without using the unit 10. It is thus capable of processing the lines of code before and/or after they are processed by the unit 10. To this end, it notably comprises a secure nonvolatile memory 29 and various hardware computation circuits. This memory 29 can only be accessed via the module 28. In this embodiment, the module 28 is configured to execute operations such as the following operations:

verifying an integrity code, constructing an integrity code from a data item, constructing the integrity code for a result from the integrity codes of the processed data.

Each computation circuit constructs an integrity code $C_{res-t}$ for a result $D_{res-p}$ from the integrity codes $C_1$ to $C_n$ of the data $D_1$ to $D_n$ processed by the unit 10 and without directly using the result $D_{res-p}$. Here, there is a computation circuit 110 for the logic instructions. There is also a computation circuit for each arithmetic instruction whose execution needs to be made secure. Here, the module 28 comprises five computation circuits 120, 130, 140, 149 and 160, each associated with a respective arithmetic instruction. These computation circuits are described in more detail in section IV that follows.

The memory 29 is used to store the secret information required for the operation of the module 28. Here, it therefore notably comprises a pre-stored secret key $\alpha$.

In this example of embodiment, the set 12 comprises general registers that can be used to store any type of data. The size of each of these registers is sufficient to store a data item or a result and the integrity code associated therewith.

A data interchange bus 24 that connects the various components of the microprocessor 2 to one another is shown in FIG. 1 in order to indicate that the various components of the microprocessor are able to interchange data with one another.

The medium 6 is typically a non-volatile memory. It is for example an EEPROM or flash memory. Here, It contains a backup copy 40 of the binary code 30. It is typically this copy 40 that is automatically copied to the memory 4 to restore the code 30, for example after a power failure or the like or just before the execution of the code 30 starts.

SECTION III—MAKING ARITHMETIC AND LOGIC INSTRUCTIONS SECURE

By injecting faults while the unit 10 is operating, it is possible to disrupt its operation so that the result of the execution of the arithmetic and logic instruction does not correspond to that expected. The unit 10 is then said to have been caused to malfunction. This section describes a solution for detecting such a malfunction of the unit 10.

The registers $R_1$ to $R_n$ denote the registers of the set 12 comprising the data D; to Da, respectively, to be processed when the instruction is executed. The register $R_{res-p}$ denotes the register of the set 12 in which the result, of the execution of the arithmetic and logic instruction, is stored.

The size, in terms of the number of bits, of each data item $D_1$, $D_2$ and $D_{res-p}$ is equal to $2^d$, where d is a whole number typically greater than four or five.

Figure 2:
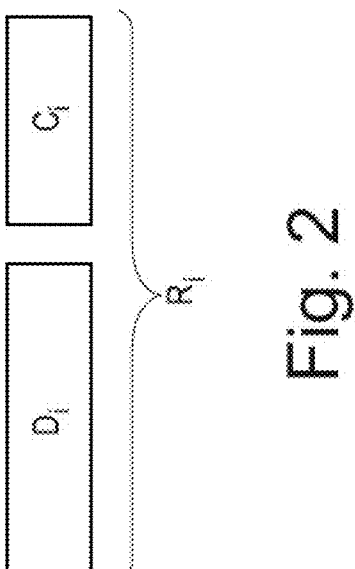
FIG. 2 is a schematic illustration of the structure of a register of the apparatus of FIG. 1.

The structures of the registers $R_1$, $R_2$ and $R_{res-p}$ are identical and shown in the specific case of the register $R_i$ in FIG. 2. The register $R_i$ comprises:

a bit range containing the data item $D_i$ a range containing an integrity code $C_i$ allowing the integrity and the authenticity of the data item $D_i$ to be checked.

The code $C_i$ is generated by the module 28 using a pre-programmed relationship defined generically by the following relationship: $C_i=Q_\alpha(D_i)$, where:

the subscript i identifies a register among the registers $R_1$, $R_2$ and $R_{res-p}$, and the function $Q_\alpha$ is a function pre-programmed in the module 28 and configured by the secret key $\alpha$.

The function $Q_\alpha$ is defined by the following relationship: $Q_\alpha(D_i)=P \text{ o } F_\alpha(D_i)$, where the symbol "o" denotes the function-composition operation. The function P is a predetermined function. In the first embodiments described below, the function P is the identity function. Thus, in these first embodiments, the function $Q_\alpha$ is equal to the function $F_\alpha$. Examples where the function P is different from the identity function are given in the section dealing with variants.

The function $F_\alpha$ is a homomorphism of a set A equipped with the "&" Boolean operation towards a set B equipped with the same "&" Boolean operation such that $F_\alpha(D_1 \& D_2)= F_\alpha(D_i) \& F_\alpha(D_2)$, and such is the case for all "&" Boolean operations. Here, the sets A and B are each the set of numbers that can be coded over $2^d$ bits, that is to say the set of possible data $D_1$ and $D_2$. Thus, using the notations introduced earlier, the function $F_\alpha$ is such that for any & Boolean operation, the circuit 110 simply computes the integrity code $C_{res-t}$ associated with the result $D_{res-p}$ of the Boolean operation $D_1 \& D_2$ using the following relationship $C_{res-1}=C_1 \& C_2$. When the Boolean operation executed is the complement operation of the data item $D_1$, the circuit 110 computes the code $C_{rest-t}$ associated with the result $D_{res-p}$ using the following relationship $C_{res-t}=C_1'$, where the symbol "'" denotes the complement operation that returns a "1" when $D_1=0$ and that returns "0" when $D_1=1$.

Figure 3:
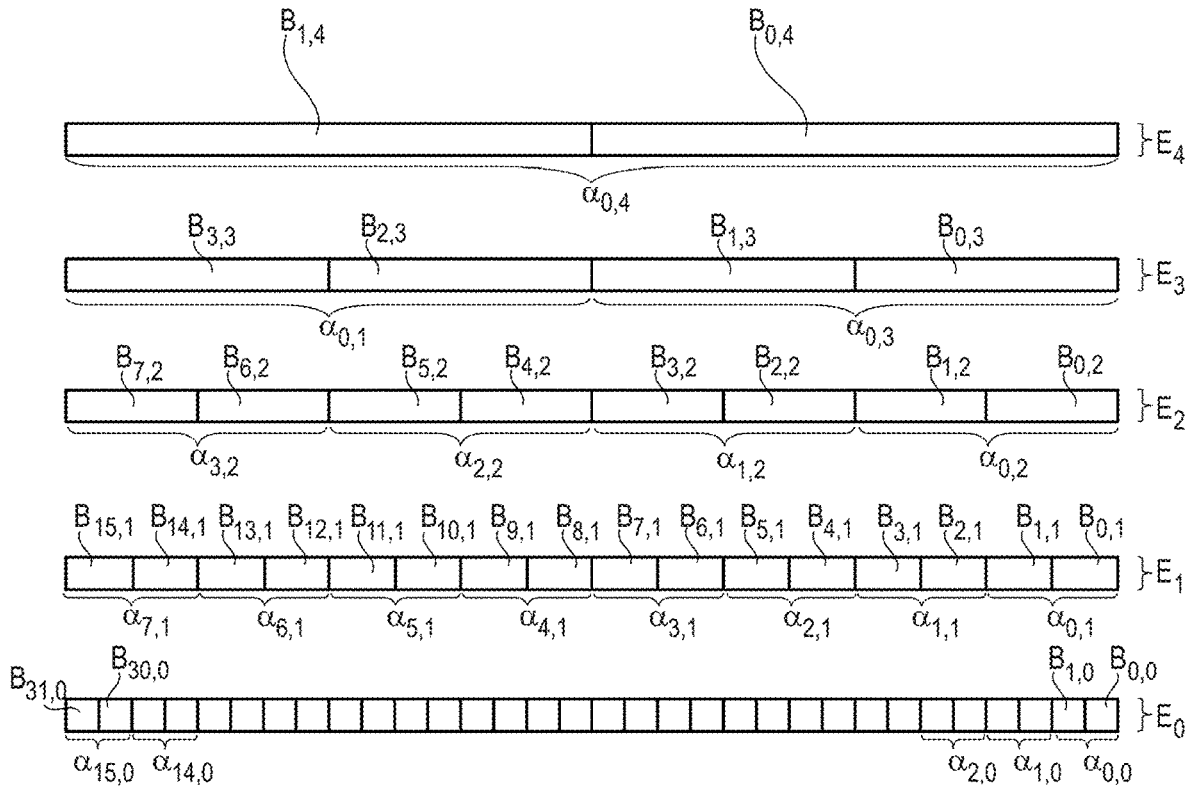
FIG. 3 is a schematic illustration of a function $F_\alpha$ executed by the apparatus of FIG. 1.

FIG. 3 shows the function $F_\alpha$ used in this embodiment. The function $F_\alpha$ is defined by the following relationship: $F_\alpha(D_i)=E_0 \text{ o } \ldots \text{ o } E_q \text{ o } \ldots \text{ o } E_{NbE-1}(D_i)$, where:

each function $E_q$ is a stage of transpositions that can be executed in parallel, NbE is the number of stages of transpositions, and the subscript q is an order number between zero and NbE-1.

The number NbE is greater than one and less than or equal to d. Preferably, the number NbE is equal to d. In FIG. 3, d=5 and NbE=5.

Each stage $E_q$ of transpositions is defined by the following relationship: $E_q(x)=T_{\alpha m,q} \text{ o } \ldots \text{ o } T_{\alpha j,q} \text{ o } \ldots \text{ o } T_{\alpha 1,q} \text{ o } T_{\alpha 0,q}(x)$, where:

x is a variable whose size, in terms of the number of bits, is equal to the size of the data item $D_i$, $T_{\alpha j,q}$ is a conditional transposition, configured by the parameter dig, that permutes two blocks of bits $B_{2j+1,q}$ and $B_{2j,q}$ of the variable x when the parameter $\alpha_{j,q}$ is equal to "1" and that does not permute these two blocks of bits when the parameter $\alpha_{j,q}$ is equal to "0", "m+1" is the total number of transpositions $T_{\alpha j,q}$ of the stage $E_q$, "j" is an order number identifying the transposition $T_{\alpha j,q}$ among the other transpositions of the stage $E_q$. The subscript "j" therefore also identifies the position of the blocks $B_{2j+1,q}$ and $B_{2j,q}$ in the variable x. In this application, the blocks are classified in ascending order of their subscript, which depends on the value of the subscript).

Each transposition $T_{\alpha j,q}$ is distinguished from all of the other transpositions of the function $F_{\alpha}$ by the fact that it is the only one that permutes the two blocks $B_{2j+1,q}$ and $B_{2j,q}$ when the parameter $\alpha_{j,q}$ is equal to "1". Moreover, the blocks $B_{2j+,q}$ and $B_{2j,q}$ of all of the transpositions $T_{\alpha j,q}$ of the same stage $E_q$ are different from one another and do not overlap. Thus, all of the transpositions $T_{\alpha j,q}$ of the stage $E_q$ can be executed in parallel. Here, the stages $E_q$ are executed one after the other in descending order of the subscripts q.

Moreover, this function $F_{\alpha}$ has the following characteristics:

the blocks $B_{2j+1,q}$ and $B_{2j,q}$ permuted by the transpositions $T_{\alpha j,q}$ are adjacent blocks, the size of the blocks $B_{2j+1,q}$ and $B_{2j,q}$ is equal to $2^q$, the number m of transpositions $T_{\alpha j,q}$ per stage $E_q$ is equal to $2^{d-q-1}$.

The notations $B_{2j+1,q}$ and $B_{2j,q}$ indicate that these are the (2j+1)-th and 2j-th blocks of $2^q$ bits, respectively, of the variable x. In FIG. 3, the block $B_{0,q}$ is the least significant block of bits, the block $B_{1,q}$ the next block and so on. Each horizontal brace in FIG. 3 encompasses the two blocks $B_{2j+1,q}$ and $B_{2j,q}$ of a transposition $T_{\alpha j,q}$ for which the parameter is $\alpha_{j,q}$.

In the case of FIG. 3, for all of the stages $E_q$ for which q is less than NbE-1 and for all of the transpositions $T_{\alpha j,q}$ of this stage, the blocks $B_{2j+1,q}$ and $B_{2j,q}$ are both placed within one and the same block $B_{1,q+1}$ of the higher stage $E_{q+1}$, where the subscript "l" denotes the block of the higher stage that contains the blocks $B_{2j+1,q}$ and $B_{2j,q}$. For example, as can be seen in FIG. 3, the blocks Big and Bog of the stage $E_q$ are consistently placed within the block $B_{0,q+1}$ of the higher stage $E_{q+1}$. Moreover, here, each block of a higher stage $E_{q+1}$ contains at most two blocks of the lower stage $E_q$.

The operation of the microprocessor 2 in order to make the execution of arithmetic and logic instructions secure will now be described in more detail with reference to FIG. 4.

The method begins by providing, in a step 86, the binary code 30. During this step, in this example, the binary code 30 is loaded into the memory 4 from the medium 6. Next, execution of the binary code 30 by the microprocessor 2 begins.

In a step 88, each time a data item $D_i$ is stored in the cache memory 27, the module 28 computes the code $C_i$ using the relationship $C_i=F_{\alpha}(D_i)$. Next, the data item D; and the code $C_i$ associated therewith are both stored in the memory 27.

Each time an Instruction to load a data item into one of the registers R, is executed by the unit 10, in a step 90, the data item $D_1$ and the code Cr are written to this register $R_i$.

Prior to the execution of an arithmetic and logic instruction between two data items $D_1$ and $D_2$, step 90 is executed once for the data item $D_1$ and once for the data item $D_2$.

Next, each time an arithmetic and logic instruction is about to be executed by the unit 10, just before it is executed, in a step 94, the module 28 checks whether there is an error in the data item D; contained in the register $R_i$ identified by an operand of the instruction to be executed.

During this step, for each register $R_i$ in question, the module 28 checks, using the code C contained in the register R, whether or not the data item D, currently stored in this register has an error. For example, this involves the module 28 computing a code $C_i$* using the relationship $C_i*=F_{\alpha}(D_i)$ and without using the code $C_i$ stored in the register $R_i$. If the code $C_i$* computed in this way is identical to the code $C_i$ stored in the register $R_i$, then the integrity and authenticity of the data item $D_i$ are confirmed. In that case, the module 28 detects no error and proceeds to a step 96. Otherwise, the module 28 proceeds to a step 102.

In step 102, the module 28 triggers signalling of an execution fault.

If the module 28 detects no error, in step 96, the microprocessor 2 decodes the arithmetic and logic instruction and then the unit 10 executes it and stores its result $D_{res-p}$ in the register $R_{res-p}$.

When the executed instruction is an arithmetic and logic instruction whose execution is secure, in parallel with step 96 or after the execution of step 96, in a step 98, the module 28 computes the code $C_{res-t}$ by using only the codes $C_i$ associated with the data $D_i$ processed by the unit 10 in step 96. Thus, when it is the data $D_1$ and $D_2$ that are processed, the code $C_{res-t}$ is computed by combining the codes $C_1$ and $C_2$ stored in the registers $R_1$ and $R_2$, respectively, prior to execution of the logic instruction.

More precisely, when the executed instruction is a logic instruction, the circuit 110 computes the code $C_{res-t}$ using the following relationship: $C_{res-t}=C_1$ & $C_2$, where the "&" symbol denotes the Boolean operation executed by the unit 10 in step 96.

When the executed instruction is an arithmetic instruction for which the module 28 comprises a specific computation circuit for computing the code $C_{res-t}$, then this specific circuit is selected and the code $C_{res-t}$ is computed by this specific circuit. Examples of such specific computation circuits are described in detail in the section that follows.

Next, in a step 100, the module 28 checks whether the computed code $C_{res-t}$ corresponds to a code $C_{res-p}$ computed from the result $D_{res-p}$ stored in the register $R_{res-p}$. In the case of the circuits 110, 120, 130, 149 and 160, the code $C_{res-p}$ is computed by implementing the relationship $C_{res-p}=F_{\alpha}(D_{res-p})$. When the code $C_{res-t}$ is computed by the circuit 140, the code $C_{res-p}$ is equal to the result $D_{res-p}$.

Next, the module 28 compares the computed codes $C_{res-p}$ and $C_{res-t}$. If these codes are different, the module 28 triggers the execution of step 102. Otherwise, this means that the code $C_{res-t}$ corresponds to the code $C_{res-p}$ and therefore that there was no fault during the execution of the instruction by the unit 10. In this last case, no signalling of an execution fault is triggered and the method continues with the execution of the next instruction in the queue 22.

The execution of steps 98 and 100 allows a malfunction in the unit 10 to be detected, because the computed codes $C_{res-p}$ and $C_{res-t}$ are identical only if the unit 10 has executed the arithmetic and logic instruction correctly. In the case of a logic instruction, this can be explained simply by the following relationship: $C_{res-p}=F_{\alpha}(D_{res-p})=F_{\alpha}(D_1 \& D_2)=F_{\alpha}(D_1)$ & $F_{\alpha}(D_2)=C_1$ & $C_2=C_{res-t}$ In the case of arithmetic instructions, this can be explained by the structure and the operations performed by the implemented computation circuit.

If the instruction executed in step 96 is the complement operation for the data item $D_1$, in step 98, the code $C_{res-t}$ is computed using the following relationship: $C_{res-t}=C_1'$. The remainder of the method is then identical to what was described earlier. In the case of the complement operation, the codes $C_{res-p}$ and $C_{res-t}$ are identical only if the unit 10 has operated correctly. This can be demonstrated using the following relationship: $C_{res-p}=F_{\alpha}(D_{res-p})=F_{\alpha}(D_i)=F_{\alpha}(D)=C'=C_{res-t}$.

In response to an execution fault being signalled, in a step 104, the microprocessor 2 implements one or more countermeasures. A wide range of countermeasures are possible. The countermeasures implemented may have very different degrees of severity. For example, the countermeasures that are implemented may range from simply displaying or simply storing an error message without interrupting the normal execution of the machine code 32 as far as definitively taking the microprocessor 2 out of service. The microprocessor 2 is considered to be out of service when it is definitively put into a state in which it is incapable of executing any machine code. Between these extreme degrees of severity, there are many other possible countermeasures, such as:

using a human-machine interface to indicate detection of the faults, immediately interrupting the execution of the machine code 32 and/or reinitializing it, and deleting the machine code 32 from the memory 4 and/or deleting the backup copy 40 and/or deleting the secret data.

SECTION IV—EXAMPLES OF COMPUTATION CIRCUITS FOR COMPUTING THE CODE $C_{res-t}$ The function $F_\alpha$ described earlier allows the bit locality to be preserved. This denotes the property according to which the bits of a data item $D_i$ that are placed within the block $B_{2j+1,q}$ or $B_{2j,q}$ still remain within this block. In other words, the transpositions $T_{\alpha j,q-1}$ to $T_{\alpha j,0}$ that apply to the bits of this block $B_{2j+1,q}$ or $B_{2j,q}$ cannot permute a bit of this block with a bit placed outside this block. On the other hand, the bits of the block $B_{2j+1,q}$ or $B_{2j,q}$ can be moved within this block by applying these transpositions $T_{\alpha j,q-1}$ to $T_{\alpha j,0}$. This stems from the fact that, for all of the stages $E_q$ for which q is less than NbE-2 and for all of the transpositions $T_{\alpha j,q}$ of this stage, the blocks $B_{2j+1,q}$ and $B_{2j,q}$ are both placed within one and the same block $B_{i,q+1}$ of the higher stage $E_{q+1}$. It is this particular property of the function $F_a$ that allows simple and fast computation circuits for computing the code $C_{res-t}$ to be produced, for each arithmetic instruction. This is illustrated below in the particular case of bit shift instructions, a rotation instruction and an addition instruction. However, on the basis of these examples, a person skilled in the art is capable of producing other computation circuits for computing the code $C_{res-t}$ for other arithmetic instructions.

FIG. 5 shows the computation circuit 120 for computing the code $C_{res-t}$ when the arithmetic instruction executed by the unit 10 is a logic shift instruction for shifting the bits of the data item $D_i$ 1 bit to the left. The code $C_{res-t}$ is computed only from the code $C_1$. To simplify FIG. 5, the circuit 120 is illustrated in the particular case where the size of the codes $C_i$ and $C_{res-t}$ is equal to 8 bits. In this case, the number NbE of stages is equal to three. However, the description provided for this particular size can easily be generalized for all possible sizes.

In FIG. 5, the eight consecutive bits of the code $C_1$ are denoted by the symbols $a_0$ to $a_7$, where $a_0$ is the least significant bit and $a_7$ is the most significant bit.

The bits of the code $C_{res-t}$ are denoted by the symbols $a'_0$ to $a'_7$, these bits $a'_0$ to $a'_7$ being classified in the same order as the bits of the code $C_1$.

For each stage $E_q$ of the function $F_\alpha$, the circuit 120 comprises a corresponding stage $ED_q$. Each stage $ED_q$ comprises a component $CD_{\alpha j,q}$ for each transposition $T_{\alpha j,q}$ of the stage $E_q$. More precisely, each component $CD_{\alpha j,q}$ is associated with a respective corresponding transposition $T_{\alpha j,q}$. The components $CD_{\alpha j,q}$ are classified in ascending order of their subscript, which varies depending on the subscript j.

For q less than NbE-1, the components $CD\alpha j,q$ are all structurally identical to one another. One of these components $CD_{\alpha j,q}$ is shown in more detail in FIG. 6. It has three outputs 122 to 124 and four inputs 126 to 129.

The output 122 delivers the result a.k'+c.k, where a, k and c are the values received at the inputs 126, 128 and 129, respectively.

The output 123 delivers the result b.k+c.k', where b is the value received at the input 127.

The output 124 delivers the result a.k+b.k'.

The inputs 126 and 127 of each component $CD_{\alpha j,0}$ of the stage $ED_0$ are connected to the 2j-th and (2j+1)-th bits, respectively, of the code $C_1$. For q greater than zero and q less than NbE-1, the inputs 126 and 127 of each component $CD_{\alpha j,q}$ are connected, respectively, to the outputs 124 of the components $CD_{\alpha 2j,q+1}$ and $CD_{\alpha(2j+1),q-1}$, respectively, of the stage $ED_{q-1}$.

The input 128 of each component $CD_{\alpha j,q}$ receives the parameter $\alpha_{j,q}$ of the transposition $T_{\alpha j,q}$ with which it is associated.

For q greater than zero, the outputs 122 and 123 of each component $CD_{\alpha j,q}$ are connected to the input 129 of the components $CD_{\alpha(2j+1),q-1}$ and $CD_{\alpha 2j,q-1}$, respectively. For q=0, the outputs 122 and 123 of each component $CD_{\alpha j,0}$ deliver the (2)+1)-th and 2j-th bits, respectively, of the code $C_{res-t}$.

The stage $ED_{NbE-1}$ comprises a single component $CD_{\alpha 0,NbE-1}$. The component $CD_{\alpha 0,NbE-1}$ is shown in more detail in FIG. 7. It has two outputs 132 and 133 and three inputs 136 to 138. The outputs 132 and 133 deliver the results "a" and "0", respectively, when the input 138 is equal to "0", where "a" is the value received at the input 136 and "0" is the value zero. The outputs 132 and 133 deliver the results "0" and "b", respectively, when the input 138 is equal to "1", where "b" is the value received at the input 137.

The inputs 136 and 137 of the component $CD_{\alpha 0,NbE-1}$ are connected to the outputs 124 of the components $CD_{\alpha 0,NbE-2}$ and $CD_{\alpha 1,NbE-2}$; respectively. The input 138 receives the parameter $\alpha_{0,NbE-1}$. The outputs 132 and 133 are connected to the inputs 129 of the components $CD_{\alpha 1,NbE-2}$ and $CD_{\alpha 0,NbE-2}$, respectively.

When the instruction executed in step 96 is a shift instruction for shifting one bit to the left, the circuit 120 is selected in order to perform step 98. To this end, the bits of the code $C_1$ are delivered to the inputs 126 and 127 of the components $CD_{\alpha j,0}$. In response, the components $CD_{\alpha j,0}$ deliver the results present at their output 124 to the inputs 126 and 127 of the higher stage $ED_1$. This process is repeated stage by stage until the component $CD_{\alpha 0,NbE-1}$, is reached. The component $CD_{\alpha 0,NbE-1}$ then delivers the results a.k' and b.k that are present at its outputs 132 and 133, respectively, to the inputs 129 of the components $CD_{\alpha j,NbE-2}$. In response, the component $CD_{\alpha j,NbE-2}$ delivers the results a.k'+c.k and b.k+c.k' to the inputs 129 of the components $CD_{\alpha j,q}$ of the lower stage $E_q$. The process is then repeated stage by stage until the components $CD_{\alpha j,0}$ of the stage $ED_0$ are reached. The components $CD_{\alpha j,0}$ then deliver the various bits of the computed code $C_{res-t}$ at their outputs 122 and 123. Next, the method continues with step 100.

The operation of the circuit 120 is illustrated in FIGS. 8 to 10 in a simplified case where the size of the codes $C_1$ and $C_{res-t}$ is equal to four bits. The number NbE of stages $E_q$ is therefore equal to two. Moreover, in this particular example, the parameters $\alpha_{0,0}$, $\alpha_{1,0}$ and $\alpha_{0,1}$ are equal to 0, 1 and 1, respectively. The bits $a_0$, $a_1$, $a_2$ and $a_3$ of the data item $D_1$ are classified in ascending order starting from the least significant bit to the most significant bit. In these conditions, with the values given above for the parameters $\alpha_{0,0}$, $a_{1,0}$ and $\alpha_{0,1}$, the code $C_1$ is equal to $a_0$, $a_1$, $a_3$, $a_2$. The result $D_{res-p}$ itself is equal to $a_2$, $a_1$, $a_0$, 0. In FIGS. 8 and 9, the "?" symbol indicates that this value is unknown at this stage of operation.

FIG. 8 shows that when the values $\alpha_{0,0}$ and $\alpha_{1,0}$ are equal to 0 and 1, respectively, the components $CD_{\alpha0,0}$ and $CD_{\alpha1,0}$ deliver the values $a_3$ and $a_1$, respectively, at their output 124. Next, in response (FIG. 9), the component $CD_{\alpha0,1}$ delivers the values 0 and $a_1$ at its outputs 132 and 133, respectively. Finally (FIG. 10), the components $CD_{\alpha0,0}$ and $CD_{\alpha1,0}$ deliver the bits of the computed code $C_{res-t}$ at their outputs 122 and 123. In this example, the computed code $C_{res-t}$ is 0, $a_0$, $a_2$, $a_1$. It can easily be checked that this computed code $C_{res-t}$ is equal to $F_\alpha(D_{res-p})$ in the absence of an execution fault.

FIG. 11 shows the computation circuit 130 for computing the code $C_{res-t}$ when the arithmetic instruction executed by the unit 10 is a logic shift of $2^r$ bits to the left, where r is a whole number greater than one and less than NbE-1. In FIG. 11, the circuit 130 is shown in the particular case where NbE=d=4 and r=2.

The following notations are used below to describe the circuit 130. The symbols $BC_{y,r}$, $BCI_{x,r}$, $BCR_{x,r}$, and $BD_{z,r}$, denote the blocks of $2^r$ bits at the position y in the code $C_1$, at the position x in an intermediate code CI, at the position x in the code $C_{res-p}$ and at the position z in the data item $D_1$, respectively. The subscripts y, x and z here are order numbers that begin at 0 and increase by 1 each time there is a move from one block of $2^r$ bits to the next block of $2^r$ bits, moving towards the most significant bits.

The circuit 130 comprises a higher permutator 131 and a scheduler 134. The permutator 131 allows the position of the blocks of 2 bits within the code $C_{res-t}$ to be computed from the code $C_1$. To that end, here, the permutator 131 comprises stages $ED_r$ to $ED_{NbE-1}$ which are identical to the stages $ED_r$ to $ED_{NbE-1}$, of the circuit 120 except that instead of manipulating blocks of 1 bit, it is blocks of $2^r$ bits that are manipulated.

More precisely, the inputs 126 and 127 of each component $CD_{qj,q}$, for q greater than or equal to r, receives blocks of $2^r$ bits rather than of a single bit. Thus, the outputs 122 and 123 of the components $CD_{qj,r}$ deliver an intermediate code CI, in which each block $BCI_{x,r}$ of $2^r$ bits is at the desired location, that is to say at the location that it needs to occupy in the code $C_{res-t}$, to the scheduler 134.

Moreover, each block $BCI_{x,r}$ is identical to a corresponding block $BC_{y,r}$ of the code $C_1$. The reason is that the permutator 131 is only able to move the blocks $BC_{y,r}$ with respect to one another in order to obtain the intermediate code CI. The permutator 131 does not permute the bits placed within a block $BC_{y,r}$. The position of the block $BC_{y,r}$ which is Identical to the block $BCI_{x,r}$ placed at the position x in the code CI, is denoted y below.

The order of the 2' bits within the block $BCI_{x,r}$ is Identical to the order of the $2^r$ bits within the corresponding block $BC_{y,r}$. The arrangement of the $2^r$ bits within the block $BC_{y,r}$ results from application of some of the transpositions of the stages $E_{r-1}$ to $E_0$ to a corresponding block $BD_{z,r}$ when the code $C_1$ is calculated. The position of the block $BD_{z,r}$ from which the positions of the bits placed within the block $BC_{y,r}$ are computed is denoted z below. The position z of the block $BD_{z,r}$ is not necessarily the same as the position y of the block $BC_{y,r}$ because the transpositions of the stages $E_{NbE-1}$ to $E_r$ may have moved this block $BD_{z,r}$ before applying the transpositions of the next stages thereto. The composition of the transpositions $T_{\alpha j,q}$ of the stages $E_{r-1}$ to $E_0$ applied, during construction of the code $C_1$, to the bits placed within the block $BD_{z,r}$ in order to obtain the block $BC_{y,r}$ is denoted $F_{acy}$. The key $\alpha c_y$ is a subset of the key $\alpha$ that contains only the parameters of the transpositions of the function $F_{acy}$. The key $\alpha_{cy}$ is called the "current key" below because it is the one that explains the present arrangement of the bits within the block $BC_{y,r}$. The key ac, is dependent on the position y of the block $BC_{y,r}$. The parameter of the transposition $T_{\alpha j,q}$ that is contained in the current key $\alpha c_y$ is also denoted $\alpha c_{j,q}$ below.

In the code $C_{res-p}$, the arrangement of the $2^r$ bits within the block $BCR_{x,r}$ results from application, to the corresponding block $BD_{z,r}$, of some of the transpositions of the stages $E_{r-1}$ to $E_0$. The corresponding block $BD_{z,r}$ is the same as the one that corresponds to the block $BC_{y,r}$. The composition of the transpositions $T_{\alpha j,q}$ of the stages $E_{r-1}$ to $E_0$ applied, during construction of the code $C_{res-p}$, to the bits placed within the block $BD_{z,r}$ in order to obtain the block $BCR_{x,r}$ is denoted $F_{\alpha sx}$. The key as, is called the "desired key" below because it is the one that determines the arrangement of the bits within the block $BCR_{x,r}$. The key $\alpha s_x$ is dependent on the position x of the block $BCR_{x,r}$. The parameter of the transposition $T_{\alpha j,q}$ that is contained in the desired key $\alpha s_y$ is also denoted $\alpha s_{j,q}$ below.

The result of the explanations above is that the arrangement of the $2^r$ bits within the block $BCI_{x,r}$ is not necessarily identical to the arrangement of the $2^r$ bits within the block $BCR_{x,r}$ that occupies the same position x in the code $C_{res-t}$. The reason is that the current key acy is not necessarily identical to the desired key $\alpha s_x$. The scheduler 134 rearranges the order of the bits within each block $BCI_{x,r}$ to obtain the desired block $BCR_{x,r}$.

To explain this, let us suppose that the data item D; comprises four blocks, of $2^r$ bits each, denoted in the order $BD_{3,r}$, $BD_{2,r}$, $BD_{1,r}$, and $BD_{0,r}$. It is also supposed in this example that NbE=d=4 and r=2 and that the parameters $\alpha_{0,3}$, $\alpha_{1,2}$, $\alpha_{0,2}$ are equal to 1, 1 and 0, respectively. The computation of the code $C_1$ is broken down into first and second successive phases. During the first phase, it is the transpositions of the stages $E_{NbE-1}$ to $E_r$ that are applied. Thus, during this first phase, only the whole blocks $BD_{z,r}$ of the data item $D_1$ are permuted. In this example, at the end of this first phase, the order of the blocks $BD_{z,r}$ is as follows: $BD_{0,r}$, $BD_{1,r}$, $BD_{3,r}$ and $BD_{2,r}$.

Next, during the second phase, it is the transpositions of the stages $E_{1-r}$ to $E_0$ that are applied. This second phase permutes only the bits within each of the blocks $BD_{z,r}$. During this second phase, no applied transposition moves a bit placed within a block $BD_{z,r}$ to another block. At the end of this second phase, the code $C_i$ is obtained. The four blocks, of $2^r$ bits each, of the code $C_1$ obtained are denoted in the order $BC_{3,r}$, $BC_{2,r}$, $BC_{1,r}$ and $BC_{0,r}$.

During the second phase, the bits of the block $BD_{0,r}$ are permuted by applying the transpositions of the stages $E_{r-1}$ to $E_0$, which are applied only to the $2^r$ most significant bits. This stems from the fact that at the end of the first phase, the block $BD_{0,r}$ is at the location of the most significant bits, that is to say at the position y=3 here. The composition of the transpositions of the stages $E_{r-1}$ to $E_0$ that apply only to the $2^r$ most significant bits is denoted $F_{\alpha c3}$. Similarly, the compositions of transposition of the stages $E_{r-1}$ to $E_0$ that permute only the bits placed within the blocks $BD_{1,r}$, $BD_{3,r}$ and $BD_{2,r}$ respectively are denoted $F_{\alpha c2}$, $F_{\alpha c1}$ and $F_{\alpha c0}$. It is thus noted that the block $BC_{3,r}$ of the code $C_1$ is the result of application of the function $F_{\alpha c3}$ to the bits of the block $BD_{0,r}$. Similarly, the blocks $BC_{2,r}$, $BC_{1,r}$ and $BC_{0,r}$ of the code $C_1$ are the results of application of the functions $F_{\alpha c2}$, $F_{\alpha c1}$ and $F_{\alpha c0}$ to the blocks $BD_{1,r}$, $BD_{3,r}$ and $BD_{2,r}$, respectively.

Following the logic shift of $2^r$ bits to the left, the result $D_{res-p}$ is equal to the concatenation, in order, of the blocks $BD_{2,r}$, $BD_{1,r}$, $BD_{0,r}$ and of a block [0] of $2^r$ null bits.

Application of the function $F_\alpha$ to the result $D_{res-p}$ in order to compute the code $C_{res-p}$ is broken down, similarly, into a first phase then a second phase. At the end of the first phase, the blocks of the result $D_{res-p}$ are classified in the following order: [0]. $BD_{0,r}$, $BD_{2,r}$ and $BD_{1,r}$. During the second phase, the functions $F_{\alpha s3}$ to $F_{\alpha s0}$ are applied to the blocks [0], $BD_{0,r}$, $BD_{2,r}$, and $BD_{1,r}$, respectively. Thus, the blocks $BCR_{3,r}$, $BCR_{2,r}$, $BCR_{1,r}$, $BCR_{0,r}$ of the code $C_{res-p}$ are the results of application of the functions $F_{\alpha s3}$ to $F_{\alpha s0}$ to the blocks [0], $BD_{0,r}$, $BD_{2,r}$ and $BD_{1,r}$, respectively.

The intermediate code CI delivered by the permutator 131 is the concatenation, in order, of the blocks [0], $BC_{0,r}$, $BC_{2,r}$ and $BC_{1,r}$. The block $BCI_{2,r}$ is the result of application of the function $F_{\alpha c3}$ to the block $BD_{0,r}$. The desired block $BCR_{2,r}$, which occupies the same position in the code $C_{res-p}$, is the result of application of the function $F_{\alpha s2}$ to the block $BD_{0,r}$. Thus, in the case of the block $BCI_{2,r}$, the role of the scheduler 134 is to cancel application of the transpositions of the function $F_{\alpha c3}$ and to apply the transpositions of the function $F_{\alpha s2}$ instead in order to obtain the desired block $BCR_{2,r}$.

For this, for example, for each stage $E_{r-1}$ to $E_0$ of the function $F_\alpha$, the scheduler 134 comprises a stage corresponding to $EO_{r-1}$ to $EO_0$. Each stage $EO_q$ comprises $2^{d-q-1}$ comparators $CO_{j,q}$. Each comparator $CO_{j,q}$ is associated with the corresponding transposition $T_{\alpha j,q}$ that permutes the blocks $BCI_{2j+1,q}$ and $BCI_{2j,q}$ of the intermediate code CI when the value of its parameter is equal to one. The size of the blocks $BCI_{2j+1,q}$ and $BCI_{2j,q}$ is equal to $2^q$, To simplify FIG. 11, only some of these comparators are shown. Each comparator $CO_{j,q}$ receives the block $BOI_{jq+1}$, the parameter $\alpha c_{j,q}$ of the current key and the parameter $\alpha s_{j,q}$ of the desired key. If these two parameters are equal, the output of the comparator $CO_{j,q}$ delivers the blocks $BCI_{2j+1,q}$ and $BCI_{2j,q}$ to the comparators $CO_{2j+1,q-1}$ and $CO_{2j,q-1}$, respectively. In other words, the transpositions $T_{\alpha cj,q}$ and $T_{\alpha sj,q}$ are identical and no change of order of the bits is necessary. If the two parameters $\alpha c_{j,q}$ and $\alpha s_{j,q}$ are different, the comparator $CO_{j,q}$ permutes the positions of the blocks $BCI_{2j+1,q}$ and $BCI_{2j,q}$ before delivering them to the comparators $CO_{2j+1,q-1}$ and $CO_{2j,q-1}$, respectively. This replaces the transposition Togo with the transposition $T_{\alpha sj,q}$. Proceeding thus by moving from the stage $EO_{r-1}$, to the stage $EO_0$, the code $C_{rest-t}$ is obtained at the outputs of the comparators $CO_{j,0}$ of the stage $EO_0$. In FIG. 11, the bits of the code $C_{res-t}$ computed by the circuit 130 are denoted by the references $a_7$ to $a_0$.

The current ac and desired as keys are obtained as follows, for example. The key $\alpha$ is divided into $2^r$ blocks $BK_{z,r}$ of $2^r$ bits each. Each block $BK_{z,r}$ contains only the parameters $\alpha_{j,r-1}$ to $\alpha_{j,0}$ of the transpositions to be applied, when the code $C_1$ is calculated, to the bits placed within the respective block $BD_{z,r}$ of the data item $D_1$. Within each block $BK_{z,r}$, the parameters $\alpha_{j,r-1}$ to $\alpha_{j,0}$ are classified in a predetermined order. For example, here, they are first of all classified in descending order of stages and the various parameters $\alpha_{j,q}$ of one and the same stage $E_q$ are also classified in descending order of subscript j. The desired key $\alpha s$ is equal to the key $\alpha$ in which the parameters are classified as described above. Next, the various blocks $BK_{z,r}$ are permuted, for example, by a circuit identical to the permutator 131. The key containing the blocks $BK_{z,r}$ permuted in this way is equal to the current key $\alpha c$. The parameters $\alpha c_{j,q}$ and $\alpha s_{j,q}$ are the parameters that occupy the same position in the current key $\alpha c$ and the desired key $\alpha s$, respectively.

FIG. 12 shows the computation circuit 140 for computing the code $C_{res-t}$ from the code $C_1$ when the arithmetic instruction executed by the unit 10 is a shift instruction for shifting the data item $D_i$ $a_{NbE-1}2^{NbE-1}+\ldots+a_q2^q+\ldots+a_02^0$ bits to the left. The coefficients $a_{NbE-1}$ to $a_0$ are coefficients whose Boolean values are determined and fixed in advance. The circuit 140 computes a code $C_{res-t}$ that is equal to the result $D_{res-p}$ If no execution fault occurs. Thus, in this embodiment, in step 100, the code $C_{res-p}$ is equal to the result $D_{res-p}$.

For each stage $E_q$ of the function $F_\alpha$, the circuit 140 comprises a stage $ET_q$. Each stage $ET_q$ has four inputs 142 to 145 and three outputs 146 to 148. The input 142 receives a code $CP_q$ to be permuted. Each code $CP_q$ comprises $2^{d-q}$ blocks $BCP_{j,q}$, of $2^q$ bits each. These blocks $BCP_{j,q}$ do not overlap and are immediately consecutive. The subscript j which is equal to the order number of the block $BCP_{j,q}$ counting from the block $BCP_{0,q}$ that contains the least significant bits.

Each input 142 is connected to the output 146 of the previous stage $ET_{q+1}$, except the input 142 of the stage $ET_{NbE-1}$, which receives the code $C_1$ at its input 142.

The input 143 receives the parameters $\alpha_{j,q}$ of the stage $E_q$ of the function $F_\alpha$. Here, to this end, the input 143 of the stage $ET_q$ is connected to the output 147 of the previous stage $ET_{q+1}$.

The input 144 receives a permutation key $K_{ETq}$ that contains only the parameters $\alpha_{j,q-1}$ to $\alpha_{j,0}$ that are required for implementing the transpositions of the stages $E_{q-1}$ to $E_0$ of the function $F_\alpha$. This key $K_{ETq}$ is divided into $2^{d-q}$ blocks $BK_{j,q}$ of $2^q$ bits each. Each block $BK_{j,q}$ contains only the parameters $\alpha_{j,q-1}$ to $\alpha_{j,0}$ of the transpositions to be applied to the bits placed within the block $B_{j,q}$ of the data item $D_1$. Within each block $BK_{j,q}$, the parameters $\alpha_{j,q-1}$ to $\alpha_{j,0}$ are classified in a predetermined order. For example, here, they are first of all classified in descending order of stages and the various parameters $\alpha_{j,q-1}$ of one and the same stage $E_{q-1}$, are also classified in descending order of subscript j. For example, let us suppose that q=3, the transpositions to be applied to the block $B_{2,3}$ are, successively, the transpositions $T_{\alpha 2,2}$, $T\alpha_{5,1}$, $T\alpha_{4,1}$, $T\alpha_{11,0}$, $T\alpha_{10,0}$, $T\alpha_{9,0}$ and $T_{\alpha 8,0}$. This follows from the organization of the transpositions Tαje in the function $F_\alpha$ described with reference to FIG. 3. From then on, the block $BK_{2,3}$ comprises the parameters $\alpha_{2,2}$, $\alpha_{5,1}$, $\alpha_{4,1}$, $\alpha_{11,0}$, $\alpha_{10,0}$, $\alpha_{9,0}$ and $\alpha_{8,0}$ and an additional 0 to reach the size of 23 bits.

The input 145 receives the coefficient $a_q$ of the shift to be applied to the data item $D_1$.

The stage $ET_q$ comprises two permutators 150 and 151, two shift registers 154 and 155 and two multiplexers 158 to 159.

The permutator 150 executes the transpositions of the stage $E_q$ on the data received at its input 142. In other words, the permutator 150 executes the following function: $T_{\alpha m,q}o \ldots oT_{\alpha j,q}o \ldots oT_{\alpha 0,q}(CP_q)$, where m is equal to $2^{d-q-1}$.

To do this, the permutator 151 is connected to the input 142 in order to receive the code $CP_q$ to be permuted and to the input 143 in order to receive the parameters $\alpha_{m,q}$ to $\alpha_{0,q}$.

The code permuted by the permutator 150 is transmitted directly to a first input of the multiplexer 158 and, in parallel, to an input of the register 154.

The register 154 performs a logic shift of $2^q$ bits to the left on the bits received at its input in order to obtain a permuted and shifted code, which is delivered to a second input of the multiplexer 158.

The multiplexer 158 connects the first input directly to the output 146 if the coefficient a, received at the input 145 is equal to zero. If the coefficient a, received is equal to one, the multiplexer 158 connects its second input directly to the output 146.

The permutator 151 and the register 155 are identical to the permutator 150 and the register 154, respectively. They therefore perform the same operations as the permutator 150 and the register 154, respectively, but applied to the key $K_{ETq}$, that is to say to the key received at the input 144.

The multiplexer 159 selects the permuted key delivered by the permutator 151 if the coefficient $a_q$ is equal to zero. Otherwise, it selects the permuted and shifted key delivered by the register 155. Moreover, using the key selected on the basis of the coefficient $a_q$, the multiplexer 159 delivers to the output 147 the parameters $\alpha_{j,q-1}$ required for configuring the transpositions of the stage $ET_{q-1}$. It also delivers the key $K_{ETq-1}$ to the output 148.

The operation of the circuit 140 is as follows: the permutator 150 of the stage $ET_q$ cancels the effect of the transpositions Tiq of the stage $E_q$ that is applied to the data item $D_1$ when the code $C_1$ Is calculated. It should be remembered here that $T_{j,q}$ o $T_{j,q}$ is the identity function. Thus, in the permuted code delivered by the permutator 150, the blocks $BCP_{j,q}$ occupy the same position as the one that they had in the data item $D_1$. However, within each block $BCP_{j,q}$, the position of the bits corresponds to the result of application of the transpositions of the stages $E_{j,q-1}$ to $E_{j,0}$ to the bits placed within the block $B_{j,q}$ of the data item $D_1$. Thus, the order of the bits within the blocks $BCP_{j,q}$ is not the same as the order of the bits within the block $B_{j,q}$ of the data item $D_1$. However, this is not important for the application of a logic shift of $2^q$ bits to the left, because such a shift shifts only blocks of $2^q$ bits. Thus, applying the shift of $2^q$ bits in the stage $ET_q$ allows the code $C_{res-t}$ to be computed without this requiring:

the data item $D_i$ to be found from the code $C_1$, then the various logic shifts of 29 bits to be applied to this data item $D_1$ that has been found.

In this embodiment, the parameters $\alpha_{j,q-1}$ to $\alpha_{j,0}$ required for configuring all of the transpositions $T_{j,q-1}$ to $T_{j,0}$ to be applied to the bits placed within a block $BCP_{j,q}$ received at the input 142 are placed within the block $BK_{j,q}$ of the same size and occupying the same position j in the key $K_{Etq}$ received at the input 144. At the output 148, this relationship between the position of the blocks $BCP_{j,q-1}$ and the position of the blocks $BK_{j,q-1}$ is preserved. In other words, in the key delivered at the output 148, the block $BK_{j,q-1}$ contains all of the parameters $\alpha_{j,q-2}$ to $\alpha_{j,0}$ required for configuring the transpositions to be applied to the bits placed within the block $BCP_{j,q-1}$ delivered at the output 146.

To preserve this relationship, the permutator 151 and the register 155 apply the same transpositions and the same shifts, respectively, as those applied to the code $CP_q$, but this time to the key $K_{ETq}$ received. Next, the multiplexer 159 extracts from the selected key the parameters $\alpha_{j,q-1}$ to be delivered to the output 147. The multiplexer 159 also extracts the parameters $\alpha_{j,q-2}$ to $\alpha_{j,0}$ and generates the key $K_{ETq-1}$ that is delivered to the output 148. Here, the multiplexer 159 identifies the parameters dig to be extracted on the basis of their position in the selected key.

The output 146 of the stage $ET_0$ delivers the code $C_{res-t}$ to be compared with the code $C_{res-p}$ in order to check, in step 100, that the execution of the shift instruction has taken place without a fault.

FIG. 13 shows a computation circuit 149 for computing the code $C_{res-t}$ when the arithmetic instruction executed by the unit 10 is a rotation instruction for rotating the bits of the data item $D_i$ one bit to the left. This rotation instruction is identical to the shift instruction for shifting one bit to the left, except that the most significant bit of the data item $D_1$ is reinjected on the right and therefore becomes the least significant bit after this rotation has been executed.

For each stage $E_q$ of the function $F_a$, the circuit 149 comprises a corresponding stage $ER_q$. Each stage $ER_q$ comprises a component $CC_{\alpha j,q}$ for each transposition $T_{\alpha j,q}$ of the stage $E_q$. More precisely, each component $CC_{\alpha j,q}$ is associated with a respective corresponding transposition $T_{\alpha j,q}$.

For q less than NbE-2, each component $CC_{\alpha j,q}$ is identical to the component $CD_{\alpha j,q}$ of the circuit 120. The component $CC_{\alpha 0,NbE-1}$ is shown in FIG. 13 in the particular case where NbE is equal to three. In FIG. 13, it is therefore denoted by the reference $CR_{\alpha 0,2}$. The component $CC_{\alpha 0,NbE-1}$ has two inputs 152 and 153 and two outputs 156 and 157. The inputs 152 and 153 are connected to the outputs 124 of the components $CC_{\alpha 0,NbE-2}$ and $CC_{\alpha 1,NbE-2}$, respectively. The outputs 156 and 157 are connected to the inputs 129 of the components $CO_{\alpha 1,NbE-2}$ and $CC_{\alpha 0,NbE-2}$, respectively.)

The output 156 consistently delivers the same value as that received at the input 152. The output 157 consistently delivers the same value as that received at the input 153. In other words, the component $CO_{\alpha 0,NbE-1}$ consistently reverses the position of the bits received at its inputs. This allows the most significant bit to be reinjected at the location intended to receive the least significant bit.

The operation of the circuit 149 is derived from the explanations given for the circuit 120.

FIG. 14 shows the computation circuit 160 for computing the code $C_{res-t}$ when the arithmetic instruction executed by the unit 10 is an addition instruction for adding the data $D_1$ and $D_2$. This time, the code $C_{res-t}$ is computed from the codes $C_1$ and $C_2$. The circuit 160 computes the code $C_{res-t}$, which, in the absence of an execution fault, is equal to $F_\alpha(D_{res-p})$.

FIG. 14 shows the circuit 160 in the particular case where the size of the codes $C_1$ and $C_2$ and of the code $C_{res-t}$ is equal to 8 bits. In this figure, the 8 bits of the codes $C_1$ and $C_2$ are denoted, in the order towards the most significant bit, $a_0$ to $a_7$ and $b_0$ to $b_7$, respectively. The 8 bits of the computed code $C_{res-t}$ are denoted, in the same order, $s_0$ to $s_7$.

The circuit 160 comprises a stage 162 of adders and a carry look-ahead unit 164.

The stage 162 comprises an adder $AD_p$ for each pair of bits $a_p$, $b_p$ to be added. The subscript p denotes the position of the bits in the codes $C_1$, $C_2$ and $C_{res-t}$ These adders $AD_p$ are structurally identical to one another and differ from one another only in the bits $a_p$ and $b_p$ that they add.

The adder $AD_p$ is shown in more detail in FIG. 15. The adder $AD_p$ has three inputs 170 to 172 and three outputs 174 to 176. The inputs 170 and 171 receive the bits $a_p$ and $b_p$, respectively.

The input 172 receives a carry $c_p$ to be used in the addition of the bits $a_p$ and $b_p$.

The output 174 delivers the result $a_p.b_p$. The output 175 delivers the result $a_p + b_p$. The output 176 delivers the bit $s_p$. The bit $s_p$ is computed by the adder $AD_p$ using the following relationship: $s_p = a_p$ XOR $b_p$ XOR $c_p$.

The function of the unit 164 is to rapidly propagate the various carries $c_p$ to be used by the adders $AD_p$. To that end, here, the unit 164 computes the carries $c_p$ from the information delivered at the outputs 174 and 175 of each adder $AD_p$.

In this embodiment, the unit 164 comprises a stage $EA_q$ for each stage $E_q$ of the function $F_\alpha$. Each stage $EA_q$ comprises $2^{d-q-1}$ components $CA_{\alpha j,q}$, where the subscript j is the order number of the component $CA_{\alpha j,q}$ In the stage $EA_q$. Each component $CA_{\alpha j,q}$ is associated with a respective transposition $T_{\alpha j,q}$ of the function $F_\alpha$.

Here, the components $CA_{\alpha j,q}$ are all structurally identical to one another and are distinguished only by their connection to the other components of the circuit 160.

The component $CA_{\alpha j,q}$ is shown in more detail in FIG. 16. The component $CA_{\alpha j,q}$ has six inputs 180 to 185 and four outputs 188 to 191. The output 188 delivers the result $(G_r+P_r.G_l).k+(G_l+P_l.G_r).K'$, where $G_r$, $P_r$, $G_l$, $P_l$ and k are the values received at the inputs 180, 181, 182, 183 and 185, respectively.

The output 189 delivers the result $P_l.P_r$. The output 190 delivers the result $c_i.k'+(G_l+P_l.c_i).k$, where $c_i$ is the value received at the input 184. The output 191 delivers the result $c_i.k+(G_r+P_r.c_i).k'$.

The input 185 receives the parameter $\alpha_{j,q}$ of the transposition $T_{\alpha j,q}$ associated with this component $CA_{\alpha j,q}$.

The inputs 180 and 181 of each component $CA_{\alpha j,0}$ of the stage $EA_0$ are connected to the outputs 174 and 175, respectively, of the adder $AD_{2j}$. The Inputs 182 and 183 of each component $CA_{\alpha j,0}$ of the stage $EA_0$ are connected to the outputs 174 and 175, respectively, of the adder $AD_{2j+1}$.

The outputs 190 and 191 of each component $CA_{\alpha j,0}$ of the stage $EA_0$ are connected to the inputs 172 of the adders $AD_{2j}$ and $AD_{2j+1}$, respectively.

For q greater than zero:

the inputs 180 and 181 of each component $CA_{\alpha j,q}$ of the stage $EA_0$ are connected to the outputs 188 and 189, respectively, of the component $CA_{\alpha 2j,q-1}$ of the lower stage $EA_{q-1}$, the inputs 182 and 183 of each component $CA_{\alpha j,q}$ are connected to the outputs 188 and 189 of the component $CA_{\alpha(2j)+1),q-1}$ of the lower stage $EA_{q-1}$.

the outputs 190 and 191 of each component $CA_{\alpha j,q}$ are connected to the inputs 184 of the components $CA_{\alpha 2j,q-1}$ and $CA_{\alpha(2j+1),q-1}$, respectively, of the stage $ET_{q,1}$.

The outputs 188 and 189 of the component $CA_{\alpha 0,NbE-1}$ are not used. The input 184 of the component $CA_{\alpha 0,NbE-1}$ allows the carry computed by another circuit, for example identical to the circuit 160, to be received. This allows multiple circuits 160 to be linked to one another, so as to perform additions on data of greater size.

The unit 164 functions as a conventional carry look-ahead computation unit. Here, however, this conventional unit is modified to take account of the transpositions $T_{\alpha j,q}$ and therefore the parameters $\alpha_{j,q}$ that are used for computing the code $C_{res-t}$. In summary, the components $CA_{\alpha j,q}$ propagate the carry to the right when the parameter $\alpha_{j,q}$ is equal to zero and to the left when the parameter $\alpha_{j,q}$ is equal to one.

SECTION IV—VARIANTS

Variants of the Function $Q_\alpha$:

In the relationship $Q_a(D_i)=P\ o\ F_\alpha(D_i)$, the function P is not necessarily the identity function. For example, the function P is a compression function that constructs, from each of the bits of the result $F_\alpha(D_i)$, a code $C_i$ whose size, in terms of the number of bits, is less than $2^d$. The reason is that when the function P is the identity function, the size of the code $C_i$ Is equal to the size of the data item $D_i$, that is to say equal to $2^d$. Now, in some contexts, it is desirable to reduce the size of the code $C_i$. For example, this is desirable in order to reduce the space that it can take up in the cache memory 27. By way of illustration, to this end, the function P is the function that performs the following operations:

1) the function P divides the result $F_\alpha(D_i)$ into two blocks $p_0$ and $p_1$ of bits of the same size, then, 2) the function P performs an "EXCLUSIVE-OR" between the blocks $p_0$ and $p_1$.

In this case, the size of the code $C_i$ is halved and is equal to $2^{d-1}$.

Many other compression functions P are possible. The function P can also be different from the identity function and from a compression function. For example, the function P is an encryption or other function.

When the function P is different from the identity function, each of the computation circuits described here is broken down into a first and a second subcircuit. The first subcircuit is identical to one of the computation circuits described earlier. This first subcircuit therefore delivers a code $C_{res-int}$, which, in the absence of an execution fault, is consistently equal to the result $F_\alpha(D_{res-p})$. The second subcircuit applies the predetermined function P to the code $C_{res-int}$ In order to obtain the code $C_{res-t}$.

The various variants are described below in the particular case where the function P is equal to the identity function. However, these variants also apply to the case where the function P is different from the identity function.

As a variant, the transposition $T_{\alpha j,q}$ permutes the blocks $B_{2j+1,q}$ and $B_{2j,q}$ when the parameter $\alpha_{j,q}=0$ and does not permute them when the parameter $\alpha_{j,q}=1$.

The function $F_\alpha$ has been described in the particular case where the stages of transpositions first transpose the blocks of greater size and end by transposing the blocks of smaller size. However, as a variant, the stages $E_q$ of transpositions can be executed and classified in reverse order. In this case, the transpositions of smaller size are applied first, ending by applying the transposition $T_{\alpha 0,NbE-1}$ of greater size. The order in which the various stages $E_q$ are classified does not modify the bit locality property described earlier. Thus, even when the order of the stages $E_q$ is reversed, it is possible to construct fast and simple computation circuits for computing the code $C_{res-t}$ for arithmetic instructions.

As a variant, one or more stages of the function $F_\alpha$ are omitted.

Some of the transpositions T$\alpha$j can be omitted. In this case, at least one of the stages comprises fewer than $2^{d-q-1}$ transpositions $T_{\alpha j,q}$.

Variants of the Computation Circuits for Computing the Code $C_{res-t}$:

The teaching provided here in the case of a few arithmetic instructions, such as shifts, rotations and additions, can be applied to other arithmetic instructions. In particular, it is possible to take the teaching provided in these particular cases as a basis for developing computation circuits for computing a code $C_{res-t}$ for other arithmetic Instructions. For example, the circuit 120 can be modified to compute the code $C_{res-t}$ corresponding to a logic shift instruction for shifting 1 bit to the right. In practice, it is sufficient, for this purpose, to retain the same circuit as the circuit 120, but to send the complement of the parameter $\alpha_{j,q}$, that is to say the parameter $\alpha_{j,q}'$, to the input 128 or 138 of each of the components $CD_{\alpha j,q}$.

Equally, it is possible to construct a computation circuit for computing the code $C_{res-t}$ for an arithmetic shift instruction for shifting one bit to the left or to the right. An arithmetic shift is distinguished from the logic shifts described earlier by the fact that the most significant bit remains unchanged and is therefore not shifted, unlike the other bits.

In the circuit 140, each 24-bit shift register can be replaced by a register that performs a rotation of 24 bits. The circuit thus obtained computes the result $C_{res-t}$, which corresponds to a rotation instruction for rotating the bits of the data item $D_1$ $a_{NbE-1}2^{NbE-1}+ \ldots +a_q2^q+ \ldots +a_0$ bits to the left. By replacing these registers with registers that perform a shift to the right or a rotation to the right, the circuit obtained computes the code $C_{res-t}$ corresponding to a shift or rotation instruction for shifting or rotating $a_{NbE-1}2^{NbE-1}+ \ldots +a_q$ $2^q+ \ldots +a_0$ bits to the right.

It is also possible to link multiple computation circuits in order to compute the code $C_{res-t}$ for an operation that corresponds to the composition of multiple suboperations for each of which there is already a computation circuit for computing the code $C_{res-t}$. For example, if the executed operation is a logic shift instruction for shifting two bits to the left, the code $C_{res-t}$ is computed by applying the circuit 120 twice. To that end, the code $C_1$ is first injected at the inputs of the circuit 120 and a first intermediate code $CI_{cres-t}$ is obtained. Next, the code $CI_{cres-t}$ is injected at the inputs of this same circuit 120 in order to obtain the desired code $C_{res-t}$.

Similarly, the circuits 120 and 130 can be linked in order to compute the code $C_{res-t}$ for a logic shift to the left for any number of bits.

If the coefficients $a_q$ are consistently constant, as a variant, the inputs 145 of the circuit 140 are omitted. In this case, the coefficients a, are wired inside each stage $ET_q$. For example, the multiplexer 158 is omitted. If the value of the coefficient $a_q$ is consistently equal to one, then the output of the register 154 is directly connected to the output 146. The multiplexer 159 is also simplified, since it consistently selects the output of the register 155. Conversely, if the coefficient $a_q$ is consistently equal to zero, then the output of the permutator 150 is directly connected to the output 146 and the register 154 is omitted. Equally, the register 155 is omitted.

As a variant, the component $CA_{\alpha0,NbE-1}$ of the circuit 160 is devoid of the outputs 188 and 189, which are not used.

As a variant, the output 175 of the component $AD_p$ delivers the result $a_p$ XOR $b_p$ rather than the result $a_p+b_p$.

In a simplified embodiment, only the execution of some arithmetic or logic instructions is secure. For example, only the execution of one of the following instructions is made secure by implementing the method described here: the bit shift instruction, the bit rotation instruction and the bit addition instruction. The execution of the other instructions, such as the logic instructions, is thus not secure. In this latter case, this means that, for these other instructions, no code $C_{rest-t}$ is calculated and step 100 is omitted.

Other Variants:

The module 28 is not necessarily a hardware module of a single block. As a variant, it is made up of multiple hardware submodules that each perform one of the specific functions of the module 28. These hardware submodules are thus preferably embedded as close as possible to the data that they process. For example, in this case, the hardware submodule that computes the code $C_i$ associated with each data item $D_i$ is embedded in the cache memory 27. From then on, the code $C_i$ associated with each data item $D_i$ stored in the cache memory 27 is computed locally in this cache memory.

As a variant, each instruction of the machine code is also associated with an integrity code $F_\alpha(I_i)$ computed from the value of the loaded instruction I; This code $F_\alpha(I_i)$ is verified just before the unit 10 executes the instruction $I_i$. This allows the signalling of an execution fault to be triggered if the Instruction $I_i$ is modified in the queue 22.

It is possible to associate the code $C_i$ with the data item $D_i$ in various ways. For example, instead of storing the code $C_i$ in the same register $R_i$ as the one that contains the data item $D_i$, the code $C_i$ Is stored in a register $RC_i$ associated with the register $R_i$ rather than in the register $R_i$.

The secret key $\alpha$ can be modified, for example, at regular intervals.

Other embodiments of step 100 are possible. For example, the module 28 computes, as in the case of the circuit 140, a code $C_{res-t}$ that is equal to the result $D_{res,p}$ in the absence of an execution fault. In this case, the code $C_{res-t}$ Is computed using the following relationship. $C_{res-t}=F_\alpha^{-1}(CI_{res-t})$, where:

the function $F_\alpha^{-1}$ is the inverse of the function $F_\alpha$, and

Chest is the code computed, for example, by the circuits 120, 130, 149 or 160.

The various computation circuits for computing the code $C_{res-t}$ that are described here can be implemented independently of one another.

SECTION V—ADVANTAGES OF THE DESCRIBED EMBODIMENTS

Computing the code $C_i$ using a secret key $\alpha$ makes the method for executing the machine code more robust in the face of attempted attacks. The reason is that the attacker then has greater difficulty in falsifying the code $C_{res-t}$ so that it corresponds to an expected code when an execution fault has been deliberately introduced. Thus, the methods described earlier have the same advantages in terms of robustness as the one described in the article by DEMEYER2019. Moreover, the use of a function $F_\alpha$ that has the locality property described earlier makes it possible to obtain computation circuits for computing the code $C_{res-t}$ that are simpler and faster than those required for implementing the method of the article DEMEYER2019.

The circuits 120, 130, 140, 149 and 160 each allow simple and fast computation of the code $C_{res-t}$ corresponding to a specific arithmetic instruction.

The circuit 110 also allows simple and fast computation of the code $C_{rest-t}$ for all Boolean operations.

The invention claimed is:

1. A microprocessor comprising:

an arithmetic and logic unit with a hardware security module; and a plurality of registers, wherein:

a) the arithmetic and logic unit is capable of executing an arithmetic instruction, comprising an opcode and one or more operands, that, when executed by the arithmetic and logic unit of the microprocessor, causes the arithmetic and logic unit to perform a mathematical operation $D_1*D_2* \ldots *D_n$ and store the result of the mathematical operation in a register $R_{res-p}$ among the plurality of registers, where:

the subscript n is equal to the number of data items $D_i$ processed by the arithmetic instruction, the subscript n being greater than or equal to one, $D_1$ to $D_n$ are data items that are stored in registers $R_1$ to $R_n$ among the plurality of registers, respectively, of the microprocessor, the size, in terms of the number of bits, of each of these data items D; being equal to 24, where d is an integer greater than two, the registers $R_1$ to $R_n$ are the registers denoted by the operands of the arithmetic instruction, the symbol "*" is the arithmetic operation denoted by the opcode of the arithmetic instruction, b) the microprocessor is configured to perform the following operations:

1) For each data item $D_i$, the hardware security module performs computation of a code $C_i$ using a relationship $C_i=Q_\alpha(D_i)$ and association of the computed code $C_i$ with the data item $D_i$, the function Q& being a pre-programmed function configured by a secret key $\alpha$ that is pre-stored in the microprocessor and known only to the microprocessor, 2) Each time an instruction for loading a data item $D_i$ into a register $R_i$ of the microprocessor is executed by the arithmetic and logic unit, the loaded data item $D_i$ is stored in the register $R_i$ and the code $C_i$ associated therewith is stored in the same register $R_i$ or in a register associated with the register $R_i$, then 3) Execution, by the arithmetic and logic unit, of the arithmetic instruction and storage of the result $D_{res-p}$ of this execution in the register $R_{res-p}$, and computation, by the hardware security module, of a code $C_{res-t}$ using the codes $C_1, C_2, \ldots, C_n$ and without using the result $D_{res-p}$, then 4) Checking, by the hardware security module, that the code $C_{res-t}$ corresponds to a code $C_{res-p}$ obtained from the result $D_{res-p}$ and triggering of the signalling of an execution fault if the code $C_{res-t}$ does not correspond to the code $C_{res-p}$ and, otherwise, suppressing this signalling, wherein the function $Q_\alpha$ is defined by the following relationship: $Q_\alpha(D_i)=P \text{ o } F_\alpha(D_i)$, where P is a predetermined function and $F_\alpha$ is a function defined by the following relationship: $F_\alpha(D_i)=E_0 \text{ o } \ldots \text{ o } E_q \text{ o } \ldots \text{ o } E_{NbE-1}(D_i)$, where each function $E_q$ is a stage of transpositions and the index q is an order number between zero and NbE-1, where NbE is a whole number greater than one and less than or equal to d, each stage $E_q$ of transpositions being defined by the following relationship: $E_q(x)=T_{\alpha m,q} \text{ o } \ldots \text{ o } T_{\alpha j,q} \text{ o } \ldots \text{ o } T_{\alpha 1,q} \text{ o } T_{\alpha 0,q}(x)$, where:

x is a variable whose size, in terms of the number of bits, is equal to the size of the data item $D_i$, $T_{\alpha j,q}$ is a transposition, configured by the parameter $\alpha_{j,q}$, that permutes two blocks of bits $B_{2j+1,q}$ and $B_{2j,q}$ of the variable x when the parameter $\alpha_{j,q}$ is equal to a first value and that does not permute these two blocks of bits when the parameter $\alpha_{j,q}$ is equal to a second value, the transposition $T_{\alpha j,q}$ being distinguished from all of the other transpositions of the function $F_\alpha$ by the fact that it is the only one that permutes the two blocks $B_{2j+1,q}$ and $B_{2j,q}$ when the parameter $\alpha_{j,q}$ is equal to the first value, the blocks $B_{2j+1,q}$ and $B_{2j,q}$ of all of the transpositions $T_{\alpha j,q}$ of the stage $E_q$ being different from one another and not overlapping in such a way that all of the transpositions $T_{\alpha j,q}$ of the stage $E_q$ can be executed in parallel, "j" is an order number identifying the transposition $T_{\alpha j,q}$ among the other transpositions of the stage $E_q$, the symbol "o" denotes the function-composition operation, the concatenation of the bits of all of the parameters $\alpha_{j,q}$ of all of the stages $E_q$ is equal to the value of the secret key $\alpha$, and for all of the stages $E_q$ for which q is less than NbE-1 and for all of the transpositions $T_{\alpha j,q}$ of this stage, the blocks $B_{2j+1,q}$ and $B_{2j,q}$ are placed within one and the same block of greater size permuted by a transposition of the higher stage $E_{q+1}$ when the parameter of the transposition of the higher stage $E_{q+1}$ is equal to the first value.

2. The microprocessor according to claim 1, wherein the number NbE is equal to d, the sizes of the blocks permuted by all of the transpositions $T_{\alpha j,q}$ of one and the same stage $E_q$ are equal to $2^q$, the blocks $B_{2j+1,q}$ and $B_{2j,q}$ permuted by each transposition $T_{\alpha j,q}$ are adjacent.

3. The microprocessor according to claim 1, wherein:

the arithmetic and logic unit is capable of executing a logic instruction that, when executed, causes a Boolean operation $D_1 \& D_2 \& \ldots \& D_n$ to be performed and the result of this Boolean operation to be stored in the register $R_{res-p}$, where the "&" symbol denotes the Boolean operation, and the microprocessor is configured to perform operations 1) to 4) for this logic instruction and, during the execution of operation 3), to compute the code $C_{res-t}$ using the following relationship: $C_{res-t}=C_1 \& C_2 \& \ldots \& C_n$.

4. The microprocessor according to claim 1, wherein the arithmetic operation is chosen from the group made up of a bit shift, a bit rotation and an addition.

* * * * *